(12) United States Patent
Surnilla et al.

(10) Patent No.: US 10,167,806 B2
(45) Date of Patent: Jan. 1, 2019

(54) METHODS AND SYSTEM FOR CENTRAL FUEL INJECTION

(71) Applicant: Ford Global Technologies, LLC, Dearborn, MI (US)

(72) Inventors: Gopichandra Surnilla, West Bloomfield, MI (US); Adithya Pravarun Re Ranga, Canton, MI (US); Mohannad Hakeem, Dearborn, MI (US); Calvin Trescott, Farmington Hills, MI (US); Joseph Norman Ulrey, Dearborn, MI (US); Peter C. Moilanen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 15/586,146

(22) Filed: May 3, 2017

(65) Prior Publication Data

US 2018/0320626 A1 Nov. 8, 2018

(51) Int. Cl.
*F02D 41/00* (2006.01)
*F01N 3/02* (2006.01)
(Continued)

(52) U.S. Cl.
CPC ......... *F02D 41/3094* (2013.01); *F01N 3/021* (2013.01); *F01N 3/10* (2013.01);
(Continued)

(58) Field of Classification Search
CPC ...... F02D 35/027; F02D 35/028; F02D 41/10; F02D 41/12; F02D 41/123; F02D 41/126; F02D 41/0087; F02D 41/0235; F02D 41/146; F02D 41/1461; F02D 41/1454; F02D 41/1456; F02D 41/1495; F02D 41/1441; F02D 2041/001; F02D 2200/025; Y02T 10/42; Y02T 10/47; F01N 3/021; F01N 3/10; F01N 3/36; F01N 11/002;
(Continued)

(56) References Cited

U.S. PATENT DOCUMENTS 5,148,776 A   9/1992   Connor
5,349,811 A   9/1994   Stickler et al.
(Continued)

OTHER PUBLICATIONS

Hakeem, M. et al., "Methods and System for Injecting Water at Different Groups of Cylinders of an Engine," U.S. Appl. No. 15/226,615, filed Aug. 2, 2016, 54 pages.

(Continued)

*Primary Examiner* — Jorge Leon, Jr.
*Assistant Examiner* — Dapinder Singh
(74) *Attorney, Agent, or Firm* — Julia Voutyras; McCoy Russell LLP

(57) ABSTRACT

Methods and systems are provided for adjusting engine operating conditions for reduction of NOx emissions. In one example, immediately after a fuel shut-off event, in response to an oxygen content of an exhaust catalyst being higher than a threshold, manifold charge cooling may be increased by increasing the portion of fuel delivered to the engine via manifold injection relative to the portion to fuel delivered via one or more of port and direct injection. By increasing manifold cooling, NOx production may be reduced.

20 Claims, 8 Drawing Sheets

(51) Int. Cl.
*F01N 11/00* (2006.01)
*F02D 41/30* (2006.01)
*F02D 41/02* (2006.01)
*F02D 41/14* (2006.01)
*F02D 41/12* (2006.01)
*F02D 41/10* (2006.01)
*F01N 3/10* (2006.01)
*F01N 3/36* (2006.01)
*F01N 3/021* (2006.01)

(52) U.S. Cl.
CPC ............. *F01N 3/36* (2013.01); *F01N 11/002* (2013.01); *F01N 11/007* (2013.01); *F02D 41/0087* (2013.01); *F02D 41/023* (2013.01); *F02D 41/0235* (2013.01); *F02D 41/0295* (2013.01); *F02D 41/10* (2013.01); *F02D 41/12* (2013.01); *F02D 41/123* (2013.01); *F02D 41/126* (2013.01); *F02D 41/146* (2013.01); *F02D 41/1441* (2013.01); *F02D 41/1454* (2013.01); *F02D 41/1456* (2013.01); *F02D 41/1461* (2013.01); *F02D 41/1495* (2013.01); *F01N 2250/02* (2013.01); *F01N 2430/06* (2013.01); *F01N 2560/025* (2013.01); *F01N 2560/06* (2013.01); *F01N 2900/08* (2013.01); *F01N 2900/1402* (2013.01); *F01N 2900/1602* (2013.01); *F01N 2900/1606* (2013.01); *F01N 2900/1614* (2013.01); *F01N 2900/1626* (2013.01); *F02D 2041/001* (2013.01); *F02D 2200/101* (2013.01); *F02D 2200/1002* (2013.01); *Y02T 10/42* (2013.01); *Y02T 10/47* (2013.01)

(58) Field of Classification Search
CPC ............... F01N 11/007; F01N 2430/06; F01N 2560/025; F01N 2560/06; F01N 2900/08; F01N 2900/1402; F01N 2900/1602; F01N 2900/1606; F01N 2900/1614; F01N 2900/1626

USPC ......... 60/274, 276, 277, 286, 295, 297, 299, 60/311; 123/299, 300, 431, 672, 675, 123/325, 326

See application file for complete search history.

(56) References Cited

U.S. PATENT DOCUMENTS

| | | | |
|---|---|---|---|
| 7,178,503 B1* | 2/2007 | Brehob | F02D 35/027 123/304 |
| 7,426,918 B2 | 9/2008 | Brehob et al. | |
| 7,533,518 B2* | 5/2009 | Kurtz | F02D 41/0245 60/285 |
| 8,935,996 B2 | 1/2015 | Mulye | |
| 9,206,761 B2 | 12/2015 | Cohn et al. | |
| 2007/0215130 A1* | 9/2007 | Shelby | F02D 35/027 123/637 |
| 2008/0283023 A1* | 11/2008 | Lewis | F02B 63/02 123/344 |
| 2011/0302917 A1* | 12/2011 | Styles | F02B 37/025 60/602 |
| 2012/0245827 A1 | 9/2012 | Glugla et al. | |
| 2013/0338903 A1 | 12/2013 | Pursifull | |

OTHER PUBLICATIONS

McQuillen, M. et al., "Method and System for Pulsed Engine Water Injection," U.S. Appl. No. 15/384,172, filed Dec. 19, 2016, 49 pages.

McQuillen, M. et al., "Methods and System for Adjusting Engine Water Injection," U.S. Appl. No. 15/384,204, filed Dec. 19, 2016, 75 pages.

McQuillen, M. et al., "Methods and System for Adjusting Engine Water Injection," U.S. Appl. No. 15/384,223, filed Dec. 19, 2016, 77 pages.

Alrefaai, K. et al., "Methods and System for Central Fuel Injection," U.S. Appl. No. 15/409,322, filed Jan. 18, 2017, 59 pages.

Surnilla, G. et al., "Methods and Systems for Central Fuel Injection," U.S. Appl. No. 15/586,108, filed May 3, 2017, 77 pages.

* cited by examiner

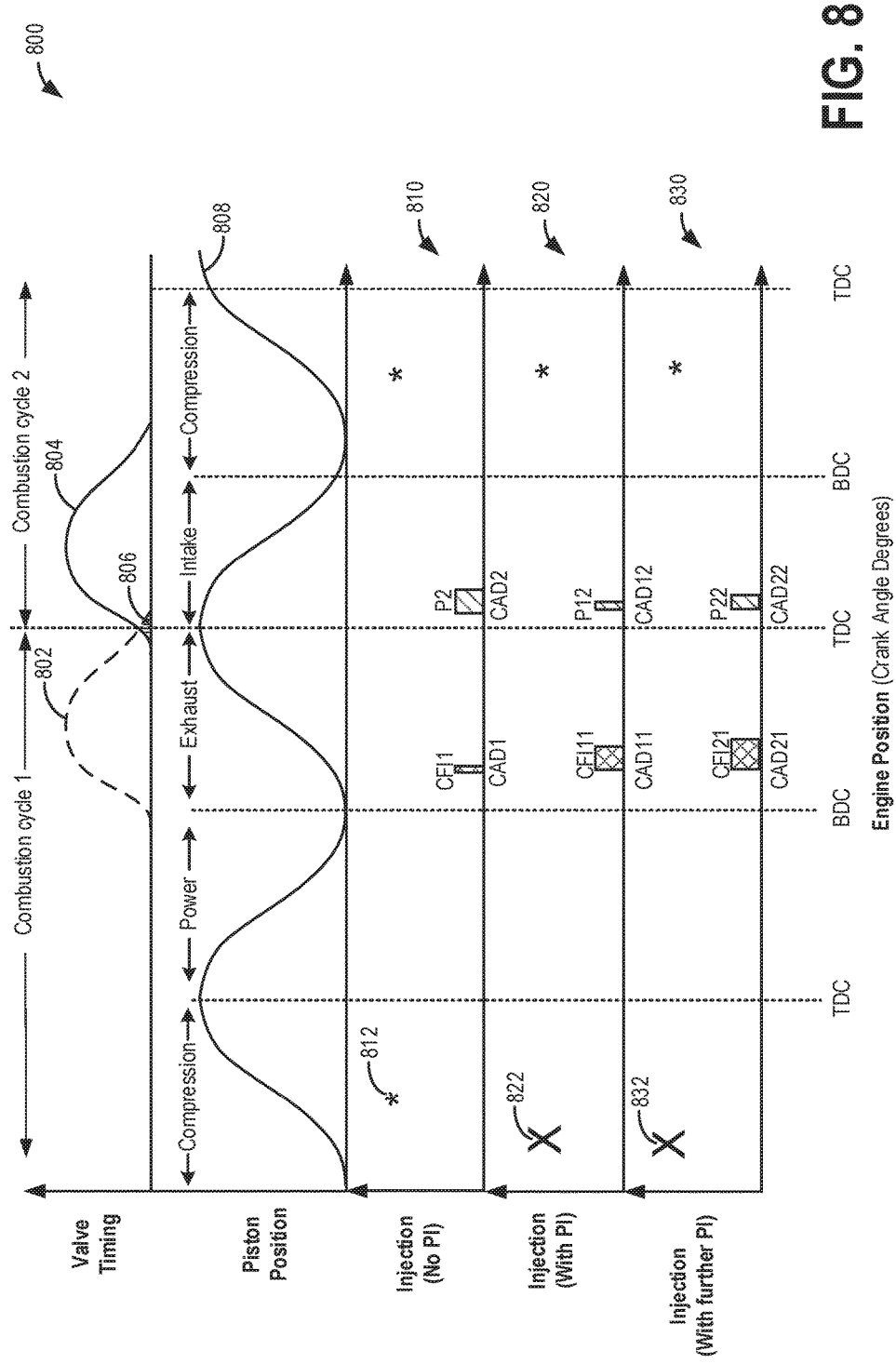

METHODS AND SYSTEM FOR CENTRAL FUEL INJECTION

FIELD

The present description relates generally to methods and systems for adjusting manifold fuel injection to reduce NOx emissions.

BACKGROUND/SUMMARY

Internal combustion engines may include central fuel injection (CFI) systems that inject fuel into an intake manifold. When fuel is injected into the engine intake, heat is transferred from the intake air and/or engine components to the fuel and this heat transfer leads to atomization of a portion of the fuel, which results in cooling of the engine components. Injecting fuel into the intake air (e.g., in the intake manifold, ports, etc.) lowers both the intake air temperature and a temperature of combustion at the engine cylinders. By cooling the intake air charge, NOx production may be reduced. NOx is stored in an exhaust catalyst which is periodically or opportunistically regenerated during richer than stoichiometric air fuel ratio operation. In addition to CFI, fuel may be injected to intake runners via port injectors and/or directly into cylinders via direct injectors.

Various approaches are provided for reducing production of NOx during engine operation. One example approach is shown by Mulye in U.S. Pat. No. 8,935,996, wherein liquid water is injected into engine cylinders during compression and power strokes to reduce the temperature of combustion at the cylinders. As the combustion temperature is reduced, there is a reduction in NOx emissions. The water is supplied to the cylinders via dedicated water injectors coupled to an on-board water source.

However, the inventors herein have recognized potential issues with such systems. As one example, increase in the amount of vaporized water in the combustion chambers, due to the water injection, may result in combustion instability. Also, there may be conditions where water may not be readily available on-board a vehicle for injection, such as due to ambient conditions or engine operating conditions not being conducive to water generation on-board the vehicle, or due to water consumption during a previous drive cycle having exceeded water generation. The water shortage may lead to an increased NOx level in the exhaust during engine operation. As another example, during engine cold-start conditions, before an exhaust catalyst attains the light-off temperature, exhaust NOx may not be effectively captured and consequently there may be an increase in NOx emissions level. Only after the exhaust catalyst has attained the light-off temperature is the exhaust catalyst able to adsorb oxidants such as NOx and oxygen passing there-through. As a further example, during conditions such as deceleration fuel shut-off (DFSO) when cylinder fueling is deactivated while air flows through the engine, the exhaust catalyst may become saturated with oxygen such that upon resumption of cylinder fueling, further adsorption of NOx may be limited until the engine is operated with a richer than stoichiometric air-fuel ratio to purge the catalyst. As a result, emissions quality may be adversely affected. In addition, the need for additional fueling to purge the catalyst adversely affects fuel economy.

In one example, the issues described above may be addressed by a method comprising: adjusting a first portion of fuel delivered to an engine via manifold injection relative to a second portion of fuel delivered to the engine via one or more of port and direct injection based on an estimated oxygen content of an exhaust catalyst, the estimated oxygen content estimated immediately after a fuel shut-off event. In this way, by injecting a portion of the total mass of fuel to be injected via central fuel injection, combustion temperatures may be reduced, thereby reducing NOx production.

As one example, during engine cold-start conditions, an engine controller may determine an initial fuel injection profile based on engine operating conditions such as engine speed and engine load. The initial fuel injection profile may include an amount of fuel to be delivered via manifold fuel injection (e.g., via a central manifold fuel injector or CFI), and a remaining amount of fuel to be delivered via one or more of port and direct fuel injection. As the fuel injected via the CFI atomizes in the intake manifold, the intake manifold may be cooled, creating a local charge cooling effect. During higher than threshold engine intake temperatures, the portion of fuel supplied via CFI may be increased until the intake temperature decreases to below the threshold temperature. Upon exit from a DFSO event, a richer than stoichiometric air fuel ratio may be maintained to desorb the NOx trapped in the exhaust catalyst and then to convert the NOx to water and nitrogen under the richer conditions. A portion of fuel delivered during the richer than stoichiometric engine operation may be provided via CFI. Also, if the catalyst is saturated with oxygen during the DFSO event, the amount of fuel supplied via CFI may be increased until the oxygen content in the catalyst decreases to below the threshold content.

In this way, during conditions conducive to production of a higher amount of NOx, by opportunistically injecting fuel via CFI, charge cooling may be increased and NOx production may be correspondingly decreased. By using manifold injected fuel for charge cooling, dependence on variably available water sourced on-board the vehicle may be reduced. By increasing manifold charge cooling during an engine cold-start, NOx production may be reduced during conditions when an exhaust catalyst is not active and is not able to optimally trap NOx. The technical effect of injecting fuel via CFI while operating at a richer than stoichiometric air-fuel ratio upon exit from a DFSO condition is that further production of NOx may be lowered. By increasing charge cooling and reducing NOx production during conditions when the catalyst is saturated with oxygen, emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8 shows example pre-ignition mitigating fuel adjustments.

DETAILED DESCRIPTION

Figure 6:
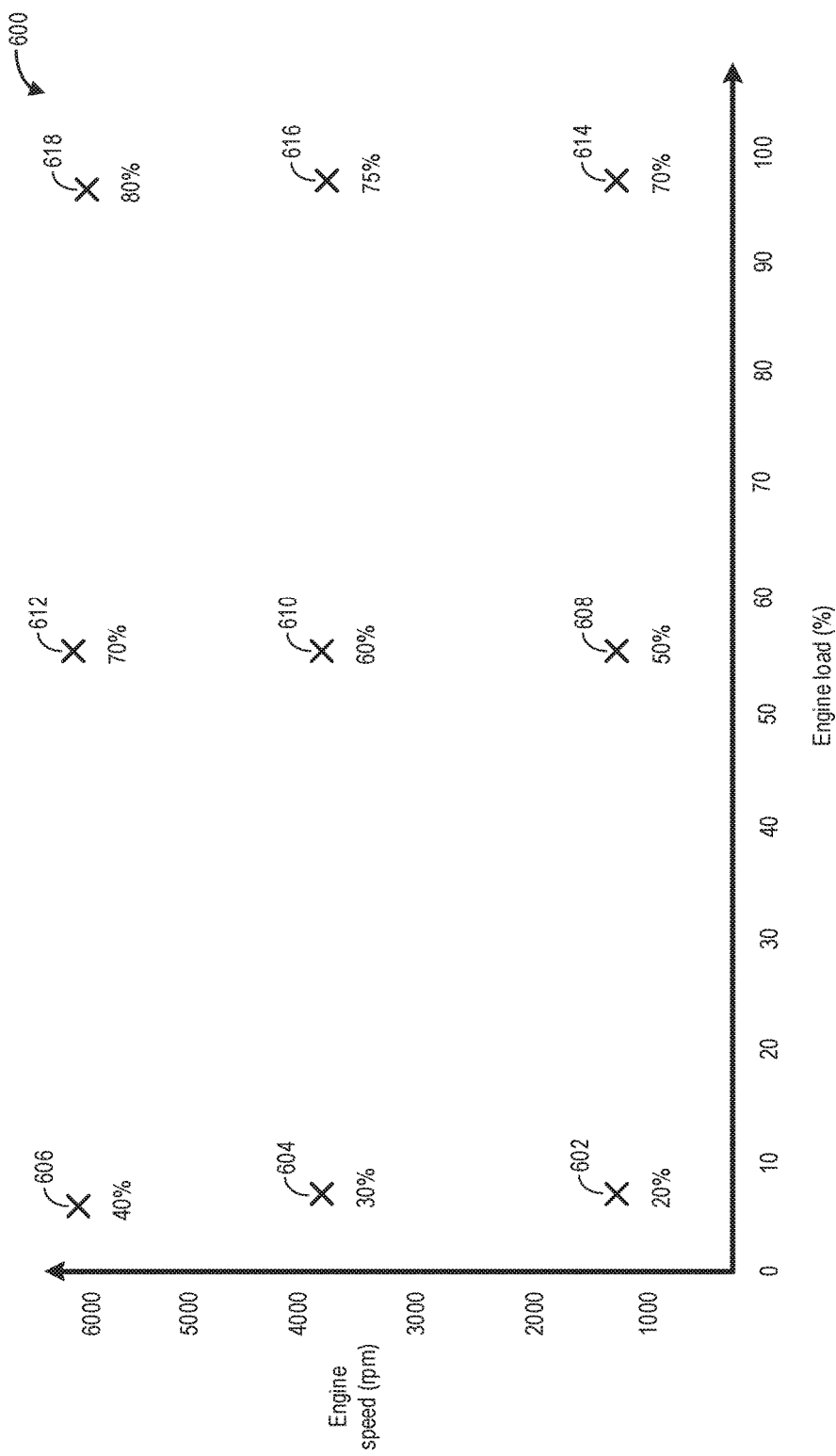
FIG. 6 shows a first example fuel split ratios selected based on engine operating conditions.
Figure 7:
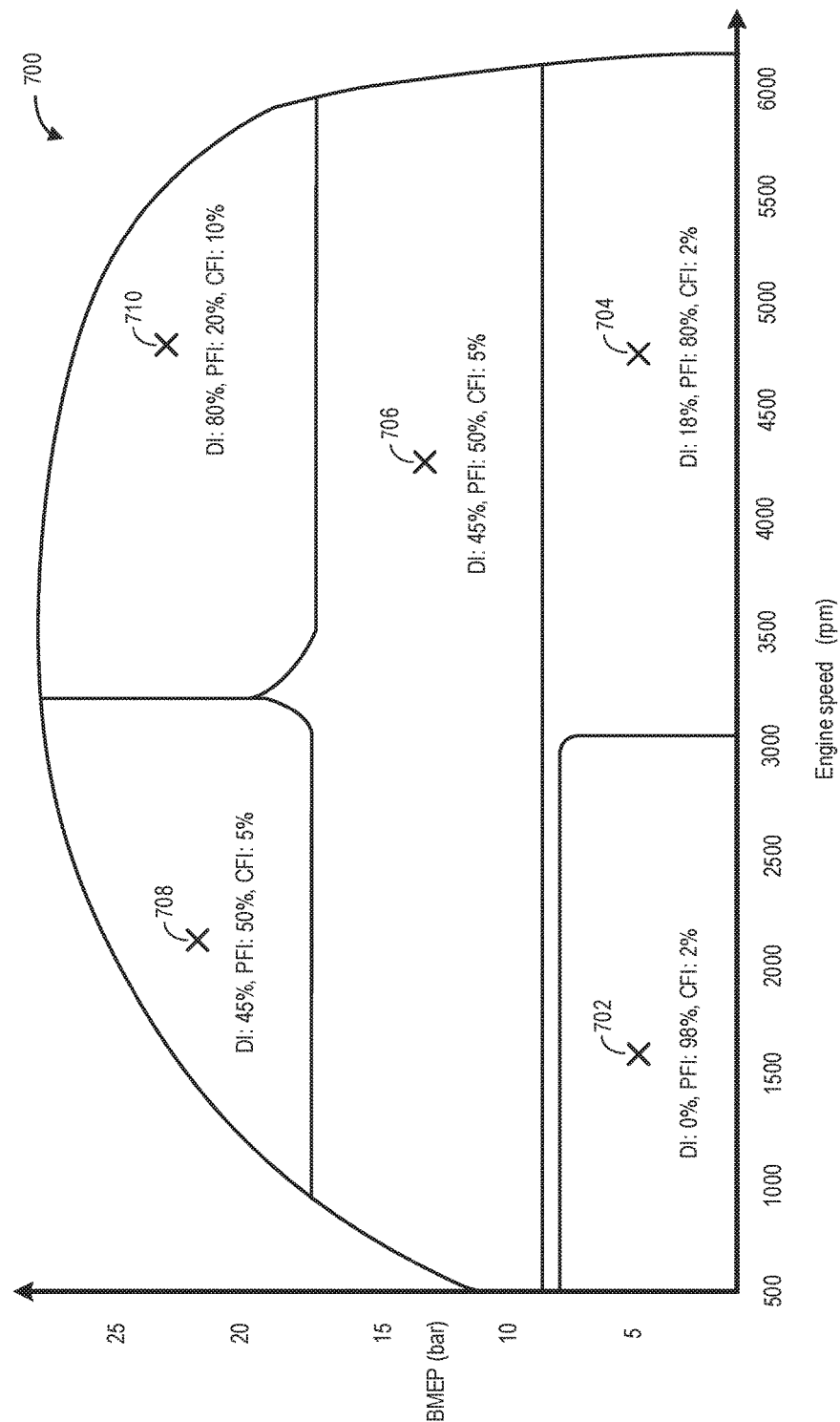
FIG. 7 shows a second example fuel split ratios selected based on engine operating conditions.

The following description relates to systems and methods for leveraging manifold fuel injection for increased charge air cooling, for reduced NOx emissions, and for pre-ignition mitigation. The methods herein may be applied to an engine system having manifold, direct, and port fuel injection capabilities, such as the engine system of FIG. 1. An engine controller may be configured to perform a control routine, such as the example routines of FIGS. 2, 3, and 5, to adjust a fueling schedule, including adjusting an amount of fuel delivered via manifold injection relative to the amount of fuel delivered via port injection and/or direct injection for reduction of NOx production and for pre-ignition mitigation. Example adjustments of fueling schedule for attaining a desired charge cooling for NOx reduction and pre-ignition mitigation are shown at FIGS. 4 and 8. Examples of fuel split ratios between manifold injection and port injection (and/or direct injection) are shown in FIGS. 6 and 7.

Figure 1:
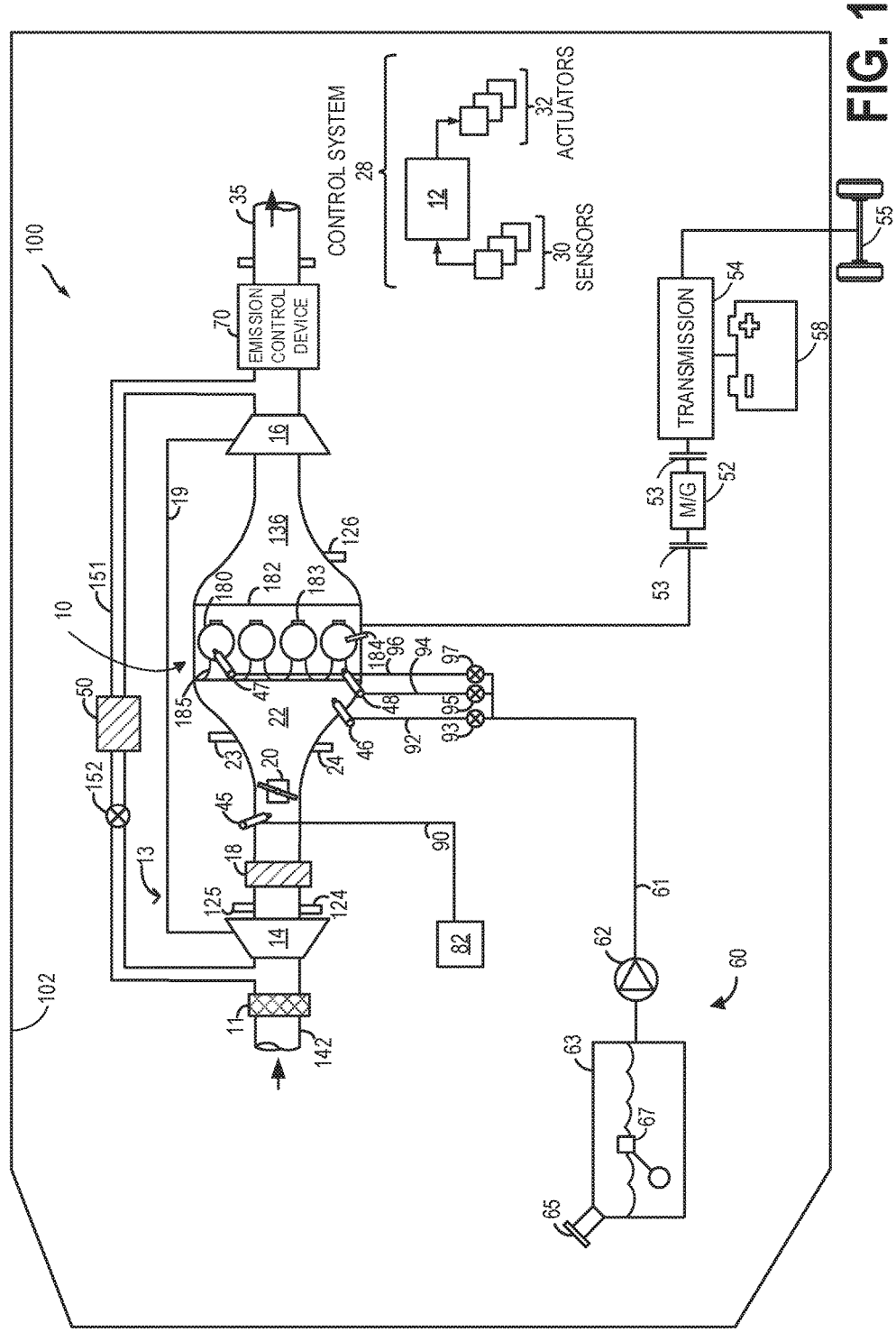
FIG. 1 shows an example embodiment of an engine system configured with manifold, direct, and port fuel injection capabilities.

FIG. 1 shows an example embodiment of an engine system 100 in a motor vehicle 102, illustrated schematically. In the depicted embodiment, engine 10 is a boosted engine coupled to a turbocharger 13 including a compressor 14 driven by a turbine 16. Specifically, fresh air is introduced along intake passage 142 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve (e.g., intake throttle) 20. The CAC may be an air-to-air or air-to-coolant heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the intake manifold 22. In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers or cylinders 180 through a series of intake valves (not shown) and intake runners (e.g., intake ports) 185. As shown in FIG. 1, the intake manifold 22 is arranged upstream of all combustion chambers 180 of engine 10. Sensors such as manifold charge temperature (MCT) sensor 23 and air charge temperature sensor (ACT) 125 may be included to determine the temperature of intake air at the respective locations in the intake passage. In some examples, the MCT and the ACT sensors may be thermistors and the output of the thermistors may be used to determine the intake air temperature in the passage 142. The MCT sensor 23 may be positioned between the throttle 20 and the intake valves of the combustion chambers 180. The ACT sensor 125 may be located upstream of the CAC 18 as shown, however, in alternate embodiments, the ACT sensor 125 may be positioned upstream of compressor 14. Each combustion chamber may further include a knock sensor 183. The combustion chambers are further coupled to exhaust manifold 136 via a series of exhaust valves (not shown).

Engine system 100 is coupled to a fuel system 60. Fuel system 60 includes a fuel tank 63 coupled to a fuel pump 62, the fuel tank supplying fuel to an engine 10 which propels a vehicle. During a fuel tank refueling event, fuel may be pumped into the vehicle from an external source through refueling port 65. Fuel tank 63 may hold a plurality of fuel blends, including fuel with a range of alcohol concentrations, such as various gasoline-ethanol blends, including E10, E85, gasoline, etc., and combinations thereof. A fuel level sensor 67 located in fuel tank 63 may provide an indication of the fuel level ("Fuel Level Input") to the controller 12. As depicted, fuel level sensor 67 may comprise a float connected to a variable resistor. Alternatively, other types of fuel level sensors may be used. Fuel pump 221 is configured to pressurize fuel delivered to a plurality of injectors of engine 10, such as example injectors 46-48.

The combustion chambers 180 are capped by cylinder head 182 and coupled to a first direct fuel injector (DI) 47 which injects fuel directly into one or more combustion chambers 180. A second port fuel injector (PFI) 48 is arranged in the intake runners for injecting fuel directly onto the intake valve. In one example, the injector 48 may be angled toward and facing the intake valve of the cylinder which the intake runner is attached to, causing fuel to be injected in the same direction as intake airflow into the cylinder. In another embodiment, injector 48 may be angled away from the intake valve and may be arranged to inject fuel against the intake air flow direction through the intake runner. Though only one representative injector 47 and injector 48 are shown in FIG. 1, each combustion chamber 180 and intake runner 185 may include its own injector. A third central fuel injector (CFI) 46, herein also referred to as a manifold fuel injector, may be coupled to the engine intake manifold 22 downstream of the throttle 20 to inject fuel directly to the intake manifold. For example, the manifold fuel injector 46 may inject fuel onto a surface of the intake manifold.

In embodiments that include multiple fuel injectors, fuel delivery passage 61 may contain one or more valves to select between different fuel injectors. For example, as shown in FIG. 1, fuel stored in fuel tank 63 is delivered to fuel injectors 46-48 via a common fuel delivery passage 61 that branches to fuel passages 92, 94, and 96. In the depicted embodiment, fuel from fuel passage 61 may be diverted through one or more of valve 93 and passage 92 to deliver fuel to CFI 46, through valve 95 and passage 94 to deliver fuel to PFI 48, and/or through valve 97 and passage 96 to deliver fuel to DI 47.

When fuel is injected into the engine intake, heat is transferred from the intake air and/or engine components to the fuel and this heat transfer leads to atomization of a portion of the fuel, which results in cooling of the engine components. The same effect also occurs when fuel is directly injected into a cylinder wherein heat is drawn in from the cylinder charge, cylinder walls, and cylinder surface. Based on engine operating conditions, engine dilution demands, and engine cooling demands, fuel may be injected through one or more of the DI, PFI, and the CFI. Based on the fuel split between the injectors (amount of fuel delivered via each injector), the valves 93, 95, and 97 may be adjusted to route fuel through one or more fuel lines 92, 94, and 96.

In one example, responsive to higher engine intake manifold cooling demands, a higher portion of the total fuel injection may be delivered via CFI 46 and a remaining portion of the total fuel may be delivered via one or more of PFI 48 and DI 47. The higher volume of fuel may be injected via CFI 46 by increasing the opening of valve 93 while correspondingly decreasing the openings of valves 95 (to provide a lower volume of PFI injected fuel) and/or valve 97 (to provide a lower volume of DI injected fuel). The higher volume of fuel injected via CFI may increase charge cooling in the intake manifold. In one example, a manifold charge temperature sensed via MCT sensor 23 before fuel injection via CFI 46 may be compared to a manifold charge temperature sensed via MCT sensor 23 after fuel injection via CFI 46. A charge cooling effect actually realized may then be determined as a function of the difference between the sensed manifold charge temperatures. During higher temperature operation of the engine, there may be an increase in NOx production due to burning of hydrocarbons at the elevated engine temperature. By increasing fuel delivery via CFI during such conditions, the resultant charge cooling effect may be leveraged to reduce NOx production. In this way, in response to a higher than threshold engine intake manifold temperature, by increasing a first portion of fuel delivered to the engine via manifold injection while decreasing a second portion of fuel delivered via one or more of port and direct injection, the engine intake manifold temperature may be decreased below the threshold engine intake manifold temperature.

Combustion chamber 180 may also draw in water and/or water vapor, which may be injected into the engine intake or the combustion chambers 180 themselves by one or more water injectors. In the depicted embodiment, a water injection system is configured to inject water upstream of the throttle 20 via water injector 45. In an alternate embodiment, water injectors may be included downstream of the throttle, in intake runners (e.g., ports), and directly in one or more combustion chambers. As an example, each combustion chamber 180 and intake runner 185 may include its own injector. Water may be delivered to each of the injector from a water tank 82 via a water line 90. The water storage tank 82 may be manually refilled via a water filling passage and/or refilled automatically by an on-board collection system. The on-board collection system may be coupled to one or more vehicle components so that the water storage tank 82 can be refilled on-board the vehicle with condensate collected from various engine or vehicle systems. In one example, collection system may be coupled with an EGR system to collect water condensed from exhaust passing through the EGR system. In another example, collection system may be coupled with an air conditioning system for collected water condensed from refrigerant passing through a condenser.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through one or more exhaust catalysts 70. The one or more exhaust catalysts 70 may include one or more exhaust after-treatment catalysts configured to catalytically treat the exhaust flow and reduce an amount of one or more substances in the exhaust flow, such as a NOx trap, oxidation catalysts, reduction catalysts, etc. During lean (relative to stoichiometry) engine operating conditions, NOx may be stored in the exhaust catalyst 70 and during rich (relative to stoichiometry) engine operating conditions, the stored NOx may be desorbed and then converted to water and nitrogen which may be released to the atmosphere. In this way, NOx emissions may be reduced during engine operations.

During fuel shut-off events, such as during a deceleration fuel shut-off condition, cylinder fueling may be selectively deactivated while cylinder valves continue to operate and air continues to be pumped through the cylinder. Due to fresh air flowing through the cylinder and on to the exhaust catalyst 70, the exhaust catalyst 70 may become saturated with oxygen, reducing the capability of the catalyst 70 to further adsorb and treat NOx. To reactivate the catalyst, upon resumption of fueling at an end of the fuel shut-off event, in response to a higher than threshold oxygen content in the exhaust catalyst, a first amount of fuel may be injected via the CFI 46 and the second remaining amount of fuel injected via one or more of port and direct injectors until the oxygen content in the exhaust catalyst reduces to below the threshold, the first amount of fuel higher than the second amount of fuel. By injecting a larger portion of the total fuel mass via CFI 46, charge cooling may be increased thereby further decreasing production of NOx until the oxygen content of the catalyst decreases and the catalyst regains the ability of treat NOx. Also, the increased first amount of fuel delivered to the engine via manifold injection may be based on the estimated oxygen content of the exhaust catalyst, the first portion increased as the estimated oxygen content of the exhaust catalyst increases above the threshold oxygen content. As such, the increased first amount of fuel may be delivered until the estimated oxygen content of the exhaust catalyst falls below the threshold oxygen content, and then the first amount of fuel delivered to the engine via manifold injection may be decreased while the second portion of fuel delivered via the one or more of port and direct injection may be correspondingly increased.

All or part of the treated exhaust from exhaust catalyst 70 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped from downstream of turbine 16. The EGR valve 152 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and increased performance. In other embodiments, the EGR system may be a high pressure EGR system with EGR passage 151 connecting from upstream of the turbine 16 to downstream of the compressor 14. In some embodiments, the MCT sensor 23 may be positioned to determine the manifold charge temperature, and may include air and exhaust recirculated through the EGR passage 151.

Engine 100 may include one or more knock sensors 183 distributed along an engine block, or coupled to individual cylinders (as shown). When included, the plurality of knock sensors may be distributed symmetrically or asymmetrically along the engine block. Knock sensor 183 may be an accelerometer, or an ionization sensor, or a cylinder pressure sensor. An engine controller may be configured to detect and differentiate abnormal combustion events due to cylinder knocking from those indicative of cylinder pre-ignition based on the output (e.g., signal timing, amplitude, intensity, frequency, etc.) of knock sensor 183, and further based on the output of a crankshaft acceleration sensor. For example, a cylinder pre-ignition event may be determined based on a cylinder knock signal estimated in a first, earlier window (such as a first window before a spark ignition event in the cylinder) being larger than a first, higher threshold, while a cylinder knock event may be determined based on a cylinder knock signal estimated in a second, later window (such as a second window after a spark ignition event in the cylinder) being larger than a second, lower threshold. In one example, the windows in which the knock signals are estimated may be crank angle windows.

Further, mitigating actions taken by the engine controller to address knock may differ from those taken by the controller to address pre-ignition. For example, knock may be addressed using spark ignition timing adjustments (e.g., spark retard) and EGR, while pre-ignition may be addressed using load-limiting, fueling schedule adjustment, fuel enrichment, or a combination thereof.

The inventors herein have recognized that by leveraging charge cooling of fuel injected via CFI, pre-ignition mitigation may be carried out without fuel enrichment. For example, in response to an indication of pre-ignition in a cylinder, a ratio of fuel delivered to the pre-ignition affected cylinder via the central fuel injector may be selectively increased relative to the direct injector for a first duration, while operating the cylinder with a stoichiometric air-fuel ratio. By increasing the ratio of fuel delivered via central fuel injector, manifold charge cooling may be increased to mitigate the occurrence of pre-ignition, without necessitating fuel enrichment. A first portion of fuel delivered via manifold injected may be increased by increasing a pulse width of a central fuel injector coupled to an engine intake manifold while correspondingly decreasing a pulse width of one or more of a direct injector and a port injector to deliver the remaining (second) portion of the total mass of fuel. As such, the increasing of the first portion of fuel delivered by the central fuel injector may be limited by the operating limit of the central fuel injector. For example, the first portion may be increased via an increase in pulse width of the central fuel injector until the operating limit of the central fuel injector is reached. Thereafter, further charge cooling may be provided by maintaining the pulse width of the central fuel injector at the operating limit while increasing the pulse width of the direct injector relative to the port injector. Delivery of the increased first portion of fuel via manifold injection relative to the second portion of fuel via one or more of port and direct injection may be carried out for a first duration, such as a first number of engine cycles, immediately after the indication of pre-ignition with no engine cycles in between. By increasing charge cooling immediately after the indication of pre-ignition, the possibility of further occurrence of pre-ignition in the pre-ignited cylinder, and in any of the remaining engine cylinders, may be reduced. If, after the completion of the first number of engine cycles, a subsequent pre-ignition event is detected in the previously pre-igniting cylinder, or in any of the engine cylinders, then the first portion of fuel delivered to the engine via manifold injection may be further increased, if possible, relative to the second portion of fuel delivered to the engine via one or more of port and direct injection to further increase the charge cooling effect. Also, in response to the continued indication of pre-ignition (e.g., persistent pre-ignition), the engine may be transitioned from the stoichiometric operation to being operated at a richer than stoichiometric exhaust air fuel ratio for a second number of engine cycles following the subsequent detection of pre-ignition. By increasing the total mass of fuel delivered during the richer than stoichiometric engine operation, a larger amount of heat may be dissipated from the engine components during vaporization of the fuel, thereby preempting further pre-ignition. Example fueling adjustments that may be used for cylinder pre-ignition mitigation are discussed in relation to FIG. 5.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input (e.g., pedal position), brake input, transmission selector position, vehicle speed, engine speed, mass airflow through the engine, boost pressure, ambient temperature, ambient humidity, intake air temperature, fan speed, etc.), cooling system sensors (such as ECT sensor, fan speed, passenger compartment temperature, ambient humidity, etc.), intake manifold sensors such as MCT sensor 23, MAP sensor 24, CAC 18 sensors such as CAC inlet air temperature, ACT sensor 125 and pressure, CAC outlet air temperature, and pressure, etc., knock sensors 183 for detection of pre-ignition and knock and/or water distribution among cylinders, and others. Furthermore, controller 12 may communicate with various actuators 32, which may include engine actuators such as fuel injectors 46-48, an electronically controlled intake air throttle 20, spark plugs 184, water injector 45, etc. In some examples, the storage medium may be programmed with computer readable data representing instructions executable by the processor for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. In one example, during exit from a DFSO event, based on an oxygen level in the exhaust catalyst 70, the controller may send a pulse width signal to manifold fuel injector 46 to inject an amount of fuel into the intake manifold to reduce manifold temperature and thereby control NOx production. In another example, the controller may estimate intake manifold temperature based on inputs from the MCT sensor 23 and in response to a higher than threshold manifold cooling demand, the controller may send a pulse width signal to manifold fuel injector 46 to inject an amount of fuel into the intake manifold to provide a charge cooling effect.

In some examples, vehicle 102 may be a hybrid vehicle with multiple sources of torque available to one or more vehicle wheels 55. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Engine 10 and electric machine 52 are connected via a transmission 54 to vehicle wheels 55 when one or more clutches 53 are engaged. In the depicted example, a first clutch 53 is provided between engine 10 and electric machine 52, and a second clutch 53 is provided between electric machine 52 and transmission 54. Controller 12 may send a signal to an actuator of each clutch 53 to engage or disengage the clutch, so as to connect or disconnect engine 10 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle. Electric machine 52 receives electrical power from a traction battery 58 to provide torque to vehicle wheels 55. Electric machine 52 may also be operated as a generator to provide electrical power to charge battery 58, for example during a braking operation.

In this way, the components of FIG. 1 enable a system for an engine comprising an intake system, an engine intake manifold including a manifold air temperature sensor, a plurality of engine cylinders, one or more direct injectors configured to direct inject a fuel into one or more of the plurality of cylinders, one or more port injectors configured to port inject the fuel into one or more of the plurality of cylinders, a central fuel injector to inject the fuel into the engine intake manifold, an engine exhaust manifold including an exhaust passage, an exhaust catalyst coupled to the exhaust passage, and an exhaust oxygen sensor coupled to the exhaust passage upstream of the exhaust catalyst, and a controller with computer-readable instructions stored on non-transitory memory for: in response to one of a higher than threshold oxygen content in the exhaust catalyst and a higher than threshold engine intake manifold temperature, selectively increasing a ratio of fuel delivered via the central fuel injector relative to fuel delivered via each of the direct injectors and the port injectors, the oxygen content estimated via the exhaust oxygen sensor and the engine intake manifold temperature via the manifold air temperature sensor.

Figure 2:
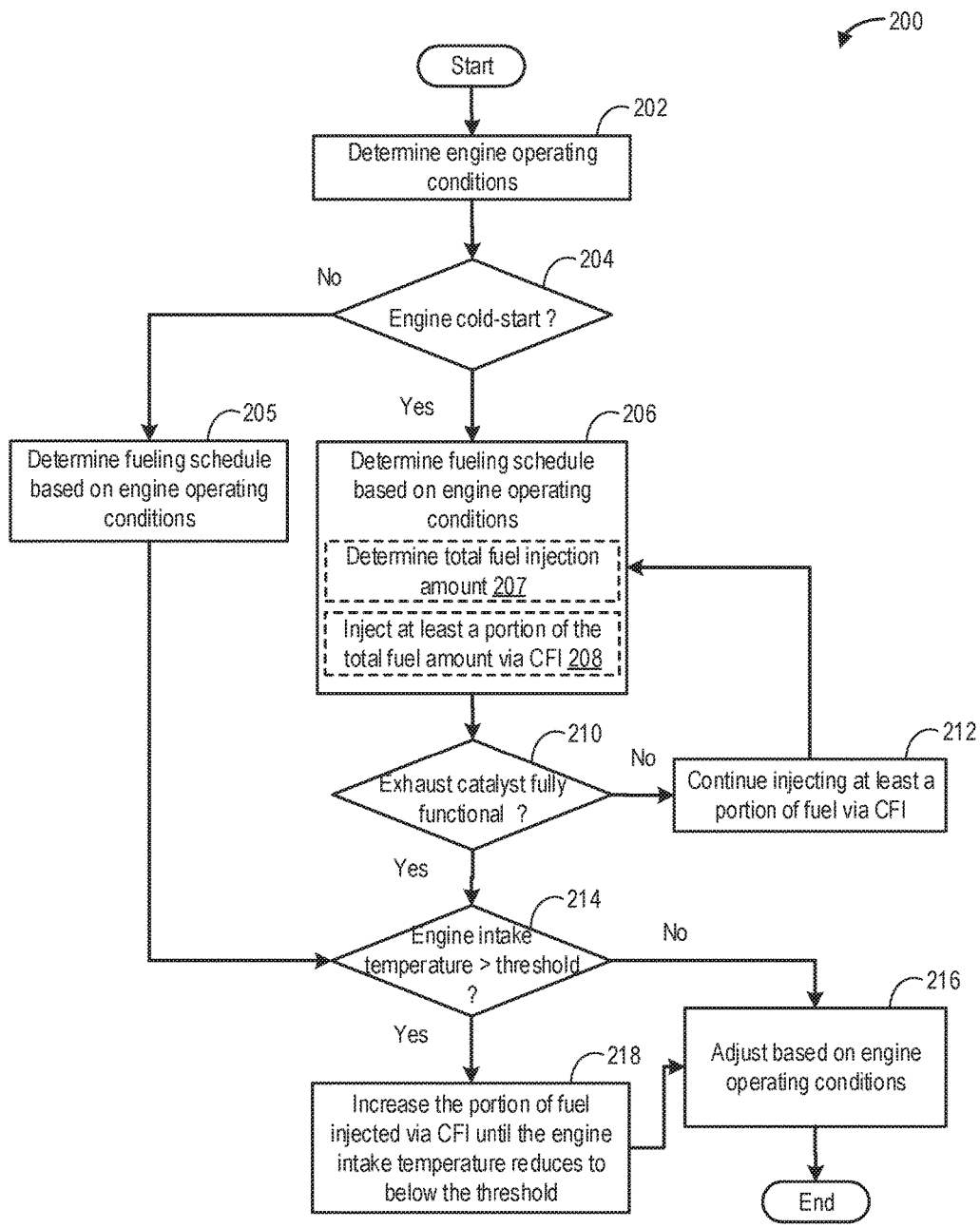
FIG. 2 shows a flow chart illustrating an example method for adjusting a fuel injection schedule during an engine cold-start.

FIG. 2 illustrates an example method 200 that may be implemented for adjusting a ratio of fuel delivered to an engine via manifold injection relative to port and/or direct injection during engine cold-start conditions. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes estimating and/or measuring engine operating conditions. Conditions assessed may include, for example, driver demand, engine temperature, engine load, engine speed, manifold charge temperature, exhaust temperature, ambient conditions including ambient temperature, pressure, and humidity, manifold pressure and air flow, boost pressure, exhaust air/fuel ratio, EGR flow, etc.

At 204, the routine includes determining if the vehicle engine is operating under cold-start conditions. An engine cold-start condition may be confirmed when the engine is started after a prolonged period of engine inactivity, when the engine temperature is lower than a threshold (such as below an exhaust catalyst light-off temperature), and while ambient temperatures are below a threshold. During engine cold-start conditions, as the temperature of the emission control device is lower than its light-off temperature, the device may not be activated and therefore may not be optimally functional. Prior to attainment of the light-off temperature, NOx produced by hydrocarbon combustion in the engine cylinders may not be effectively trapped at the exhaust catalyst (such as exhaust catalyst 70 in FIG. 1). In order to lower cold-start emissions during such conditions, it may be desirable to maintain the peak combustion temperature below a threshold temperature in order to reduce production of NOx during cold-start conditions.

Accordingly, if engine cold-start conditions are confirmed, at 206, an initial fueling schedule may be determined based on the engine cold-start conditions. For example, based on the torque demand at the cold-start, an engine dilution demand and engine cooling demand may be determined, and further, a fueling schedule may be determined that meets the torque demand while also meeting the engine dilution demand and cooling demand. Determining the initial fueling includes, at 207, determining a total amount of fuel (total fuel mass) to be injected into the engine to meet the torque demand. As the torque demand increases, the total amount of fuel to be injected may be increased. In one example, the controller may use a look-up table to determine the amount of fuel to be injected. A plurality of engine operating conditions such as engine speed, engine load may be determined based on the torque demand (or pedal position) and these may be used as input into the look-up table. The total amount of fuel to be injected may be the output of the table. As another example, the controller may make a logical determination regarding a total amount of fuel to be injected based on logic rules that are a function of engine speed, engine load, and torque demand.

Determining the initial fueling further includes, selecting one or more fuel injection locations, and corresponding fuel injectors, for injecting at least a portion of the total fuel mass. Fuel injection at the different locations provide distinct benefits. For example, manifold fuel injection may provide charge cooling in the intake manifold as fuel is vaporized by absorbing heat from the intake manifold. In addition, manifold fuel injection may effectively reduce pumping losses. As another example, direct fuel injection into the engine cylinders may provide additional in-cylinder charge cooling. The fuel injectors to be employed may be selected based on intake manifold cooling demand, dilution demand, and charge cooling demands relative to one another. The total amount of fuel to be injected may include an initial ratio of fuel to be injected via one or more of a direct injector (such as DI 47 of FIG. 1), a port injector (such as PFI 48 of FIG. 1), and a central fuel injector (such as CFI 46 of FIG. 1). The controller may generate pulse width signals that are sent to the one or more fuel injectors based on the determined initial ratio.

As one example, during cold-start conditions, there may a higher demand for manifold cooling in order to increase charge cooling such that the peak combustion temperature may be maintained below a threshold temperature and production of NOx may be reduced (cold-start emissions are lowered), at 208, at least a portion of the total fuel amount may be delivered as manifold injection via the CFI. Also, to increase in-cylinder charge cooling, a portion of the total fuel amount may be delivered as direct injection via the DI. Two or more fuel injectors (e.g., all the fuel injectors) may be selected to simultaneously inject a portion of the total fuel at different locations of the engine. The controller may determine the first portion of fuel to be delivered via CFI and a second portion of fuel to be delivered via DI during cold-start conditions based on manifold and cylinder cooling demand. As an example, in response to an increase in the manifold temperature as estimated via a manifold charge temperature (MCT) sensor, the first portion of fuel delivered via CFI may be increased while the second portion of fuel delivered via DI may be corresponding decreased. In another example, in response to an increase in in-cylinder temperature as estimated via an engine coolant temperature sensor, the second portion of fuel delivered via DI may be increased while the first portion of fuel delivered via CFI may be correspondingly decreased. Similarly, in response to a decrease in the manifold temperature following fuel injection via CFI, the first portion of fuel delivered via CFI may be decreased while the second portion of fuel delivered via DI may be increased and in response to a decrease in in-cylinder temperature following fuel injection via DI, the second portion of fuel delivered via DI may be decreased while the first portion of fuel delivered via CFI may be increased. In this way, by coordinating fuel injection delivered via CFI and DI, manifold temperature and in-cylinder temperatures may be decreased, and the peak combustion temperature may be maintained within a threshold temperature. As a result, the production of NOx during engine cold-starts is reduced. In this way, during cold-start conditions, when the exhaust catalyst may not be effective in NOx adsorption, by reducing the production of NOx, emissions quality may be improved.

Determining the split ratio may also include determining a number of fuel injections to deliver the fuel as. For example, each of the direct injected, port injected, and manifold injected fuel amount may be delivered as a single injection (of the determined amount) or as a plurality of injections (totaling the determined amount). As an example, direct injected fuel may be delivered as a single intake stroke injection, a single compression stroke injection, multiple intake stroke injections, multiple compression stroke injections, or a combination of intake stroke and compression stroke injections. In one example, as the amount of fuel to be delivered by any given fuel injector exceeds a threshold amount (such as a threshold based on the pulse width limit of the injector), the number of injections via the given injector may be decreased.

Due to the location of the manifold injection, the amount of fuel delivered via the CFI is distributed to each cylinder and maldistribution of fuel among cylinders caused by cylinder geometry may occur. To address the maldistribution, fueling via one or more of port and direct injectors may be adjusted to account for the maldistribution of fuel among the cylinders. A maldistribution of fuel injected via the central fuel injector among a plurality of cylinders may be estimated based on the amount of fuel injected via CFI and the geometry of the plurality of cylinders, and may be learned based on the knock history of each cylinder. As an example, increased tendency of knock (as learnt from the history) in one or more engine cylinders indicates maldistribution of fuel among cylinders. In one example, the controller may use a look-up table to determine the distribution of fuel among each of the plurality of cylinders. The amount of fuel injected via CFI may be the input and the amount of the manifold injected fuel received by each cylinder may be the output of the look-up table. In one example, a first cylinder of the plurality of cylinders may receive a smaller portion of the amount of fuel delivered via CFI relative to a larger portion of fuel received by each remaining cylinder of the plurality of cylinders. In one example, if a first cylinder receives a lower amount of fuel relative to the amount of fuel received by remaining engine cylinders following a manifold fuel injection, the amount of fuel delivered via one or more of port and direct injectors to the first cylinder may be increased to maintain the total amount of fuel desired to be supplied to each cylinder. In another example, if a second cylinder receives a higher amount of fuel relative to the amount of fuel received by remaining engine cylinders following a manifold fuel injection, the amount of fuel delivered via one or more of port and direct injectors to the second cylinder may be decreased to maintain the total amount of fuel desired to be supplied to each cylinder. Also, the amount of fuel delivered via one or more of port and direct injection may be adjusted to maintain an exhaust air-fuel ratio at or around a target ratio. As an example, when a richer than stoichiometric air-fuel ratio is desired, the amount of fuel delivered via one or more of port and direct injection may be increased relative to the amount of fuel delivered prior to the enrichment, while maintaining the amount of airflow, to provide the richer air-fuel ratio. As one or more of port and direct injection is used to adjust the exhaust air-fuel ratio and to balance maldistribution of fuel injected via central fuel injection, the amount of fuel injected via a combination of port and direct injection may not be reduced to below a first threshold percentage. Correspondingly, the amount of fuel injected via the central fuel injection may not exceed a second threshold percentage. In one example, the amount of fuel injected via a combination of port and direct injection may be limited to not be lower than 20% of the total amount of fuel to be injected and the amount of fuel injected via the central fuel injection may be limited to not exceed 80% of the total amount of fuel to be injected.

Based on the determined split ratio, the controller may determine a control signal to send to each of the fuel injector actuators, such as a pulse width signal. The controller may make a logical determination (e.g., regarding a pulse width signal to be sent to each fuel injector) based on logic rules that are a function of torque demand, engine dilution demand, and engine cooling demand. The controller may then send the control signals to the actuators of the corresponding fuel injectors. As such, fuel may be simultaneously injected via two or more injectors or all the injectors. Consequently, there may be a time gap between fuel injections via the plurality of injectors.

In this way, in response to a lower than threshold exhaust catalyst temperature, the first portion of fuel delivered to the engine via manifold injection may be increased while the second portion of fuel delivered via the one or more of port and direct injection may be decreased until the exhaust catalyst temperature increases above the threshold exhaust catalyst temperature.

At 210, the routine includes determining if the exhaust catalyst is active. A catalyst may attain its optimal functionality upon reaching the light-off temperature. Once the catalyst is fully activated, it may effectively adsorb NOx from exhaust, thereby improving emissions quality. If it is determined that the exhaust catalyst has not attained the light-off temperature and is not fully activated, at 212, a portion of the fuel may be continued to be delivered to via CFI for increased charge air cooling and consequent reduction in both peak combustion temperature and NOx production.

If it is determined that the exhaust catalyst is active, at 214, the routine includes determining if the engine intake manifold temperature, as estimated via an MCT sensor, is higher than a threshold temperature. If the intake manifold temperature increases above the threshold, there may be an increase in the peak combustion temperature resulting in an increase in NOx production due to the elevated combustion temperature. If it determined that the engine intake manifold temperature is lower than the threshold temperature, at 216, fueling may be adjusted based on engine operating conditions including torque demand, an engine dilution demand and engine cooling demand. As discussed in step 206, the total amount of fuel injected and the fuel split between the three injectors (CFI, PI, and DI) may be determined based on the engine operating conditions. As it is determined that the engine intake manifold temperature is lower than the threshold, manifold charge cooling may no longer be desired and the portion of fuel delivered via CFI may be correspondingly reduced.

However, if it is determined that the engine intake manifold temperature is higher than the threshold temperature, at 218, the portion of fuel delivered via CFI may be further increased. In one example, the routine adjusts the amount of fuel to be injected via CFI based on intake manifold temperature. For example, the controller may determine a control signal to send to the CFI actuator, such as a pulse width of the signal being determined based on a determination of the intake manifold temperature. The controller may determine the pulse width through a determination that directly takes into account a determined intake manifold temperature, such as increasing the pulse width with increasing intake manifold temperature. The controller may alternatively determine the pulse width based on a calculation using a look-up table with the input being intake manifold temperature and the output being pulse width. The increased manifold fuel injection may be continued until the intake manifold temperature reduces to below the threshold temperature, thereby reducing NOx production.

In one example, the amount of fuel to be delivered via the CFI is empirically determined and stored in predetermined lookup tables or functions. For example, one table may correspond to determining manifold injection amounts while additional tables may correspond to determining direct injection amounts and port injection amounts. The tables may be indexed to engine operating conditions, such as engine speed and engine load.

In this way, during engine operating conditions including a cold-start condition, the total fuel mass may be provided as a first larger amount of fuel injected via the central fuel injector and a second, smaller (remaining) amount of fuel injected via the one or more of port and direct injectors until a light-off temperature of the exhaust catalyst is attained. Also, in response to a higher than threshold intake manifold temperature, the first amount of fuel injected via the central fuel injector may be increased relative to the second remaining amount of fuel injected via the one or more of port and direct injectors until the intake manifold temperature drops below the threshold temperature and then the first and second amounts of fuel may be adjusted based on engine speed and engine load.

If at 204, it is determined that the engine is not operating under cold-start conditions, such as during a hot-start condition when the exhaust catalyst may be active at 205, the fueling schedule including the total amount of fuel to be injected and the fuel split between the different injectors may be determined based on engine operating conditions at the hot-start. The fueling schedule may be optimized to improve engine performance and may not be specifically adjusted to reduce the production of NOx as the exhaust catalyst is already active and capable of treating the exhaust NOx. The routine may then proceed to step 214 wherein it may be determined if the engine intake manifold temperature is higher than a threshold temperature and further adjustments to the fueling schedule may be carried out based on the sensed intake manifold temperature.

Figure 3:
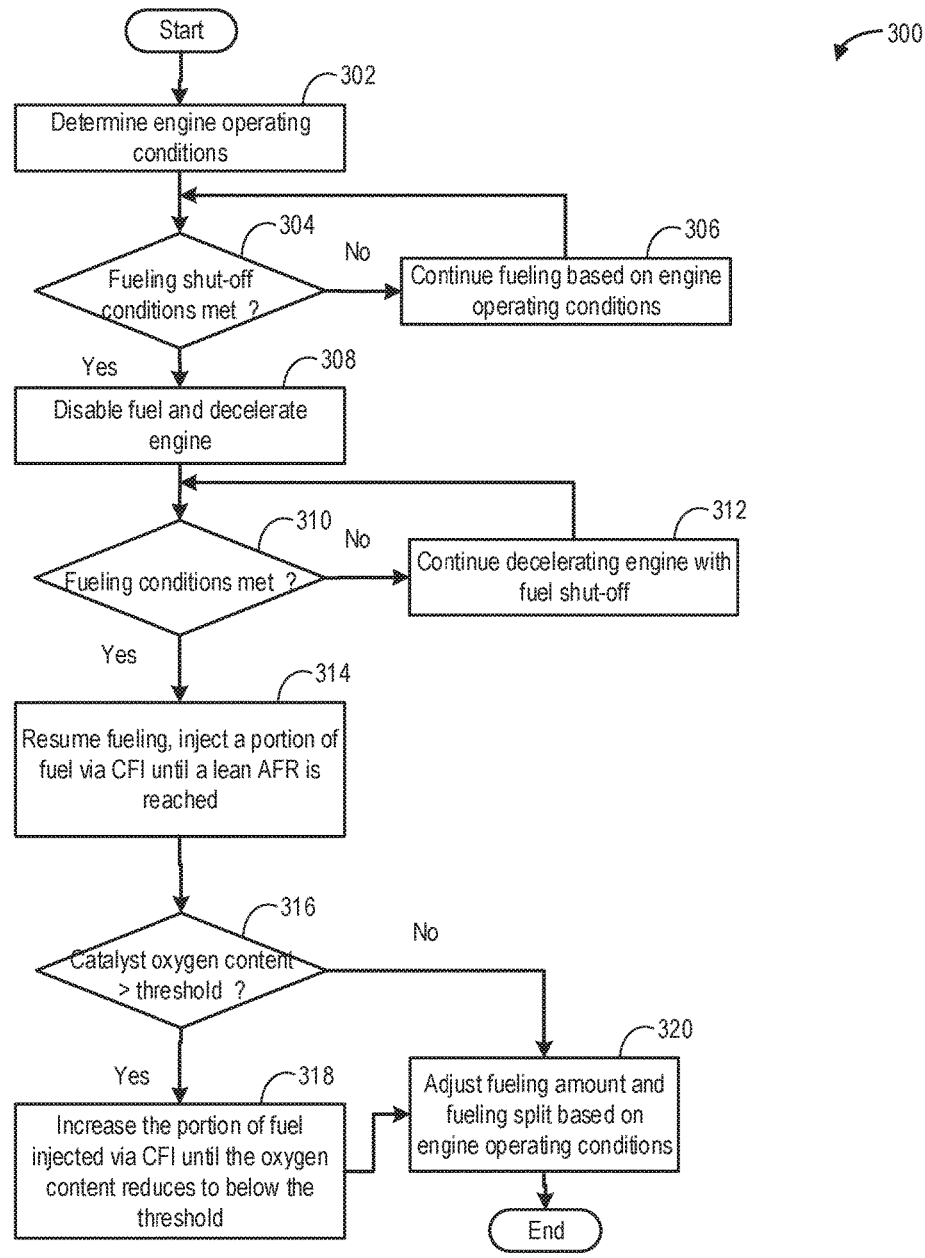
FIG. 3 shows a flow chart illustrating an example method for adjusting a fuel injection schedule during exit from a fuel shut-off event.
Figure 4:
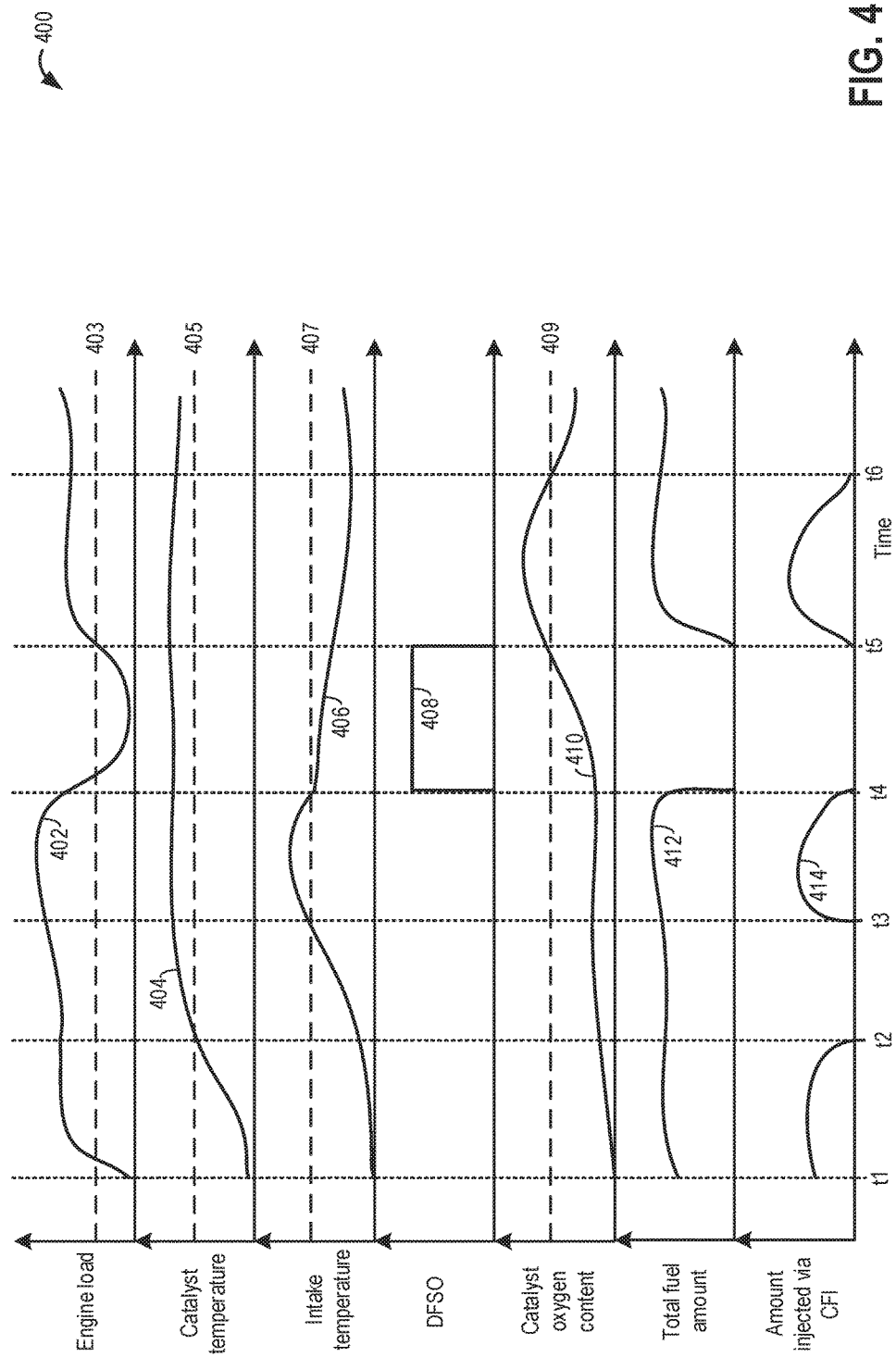
FIG. 4 shows example adjustments to a fuel injection schedule, including a manifold fuel injection amount, based on a desired charge cooling effect.

FIG. 3 illustrates an example method 300 that may be implemented for adjusting a portion of fuel delivered to an engine via manifold injection during exit from a fuel shut-off event. The method enables leveraging the effect of increased charge cooling achieved by increasing manifold injection, in order to control NOx production.

At 302, the routine includes estimating and/or sensing engine operating conditions, including, for example, driver torque demand, engine temperature, engine load, engine speed, manifold charge temperature, exhaust temperature, ambient conditions including ambient temperature, pressure, and humidity, manifold pressure and air flow, boost pressure, exhaust air/fuel ratio, EGR flow, etc.

At 304, the method includes determining if non-fueling conditions are met. In one example, fueling may be suspended during a deceleration fuel shut-off (DFSO) event. DFSO entry conditions may be determined based on various vehicle and engine operating conditions, such as a combination of one or more of operator torque demand, vehicle speed, engine speed, and engine load. In one example, DFSO entry conditions may be considered met responsive to operator torque demand being lower than a threshold. In another example, DFSO entry conditions may be considered met responsive to an operator taking their foot off the accelerator pedal without applying the brake pedal (e.g., during coasting maneuvers). In still another example, DFSO entry conditions may be considered met responsive to vehicle speed falling below a threshold, or vehicle travel on a downhill segment. In yet another example, during transmission gear shifts, such as when the gear ratio of the transmission is reduced from a higher gear ratio to a lower ratio, in order to expedite drop in engine speed, fuel may be temporarily shut-off.

If fuel shut-off conditions are not confirmed, at 306, the engine may continue to be fueled based on estimated engine operating conditions such as engine speed, engine load, operator torque demand, etc. As an example, the amount of fuel to be injected and the fuel split between different injectors including a central fuel injector (CFI), a direct fuel injector (DI), and a port fuel injector (PFI) may be determined based on engine operating conditions. The controller may then send a pulse width corresponding to the determined fuel amount to actuators coupled to one or more corresponding fuel injectors to inject the determined amount of fuel to the cylinders.

If fuel shut-off conditions are confirmed, then method 300 proceeds to 308 to decelerate the engine with fuel shut-off. As an example, fuel may be shut off by disabling all fuel injectors (each of CFI, DI, and PFI) while maintaining cylinder valve operation. During fuel shut-off, the engine is operated without fuel injection while the engine rotates and pumps air through the cylinders. As such, when an oxidant such as oxygen and NOx flows through the exhaust catalyst, the oxidant is adsorbed by the catalyst. Therefore, as air is pumped through the engine without combustion, the oxygen content of the exhaust catalyst may increase. Increased oxygen content in the exhaust catalyst may result in reduced ability for NOx treatment (conversion to water and nitrogen) at the exhaust catalyst.

At 310, the routine includes determining if fueling conditions are met. Also, the routine may include determining if DFSO exit conditions are met. In one example, after a gear up-shift has been completed, after the engine speed has dropped to the desired engine speed corresponding to the higher gear-ratio, fueling may be restarted. As another example, fueling conditions may be met once DFSO exit conditions are confirmed, such as in response to an increase in operator torque command requiring resuming of cylinder fuel injection, responsive to operator depression of an accelerator pedal, or an anticipated increase in torque demand such as during vehicle travel on an uphill segment. In yet another example, DFSO exit conditions may be confirmed when the engine decelerates unfueled to below a threshold speed, below which the engine may be shut down. If fueling conditions are not met, at 312, the engine may continue to decelerate with fuel maintained shut off and with cylinder valve operation maintained. The engine then remains in the DFSO condition until DFSO exit conditions are met.

If fueling conditions are met, then method 300 proceeds to 314 to resume fueling the engine. Resuming fueling in the engine may include activating or enabling the fuel injectors which were previously deactivated at 308. Upon resuming fueling, the fueling schedule including the fueling amount and the fueling split ratio between manifold fuel injection, port fuel injection, and direct fuel injection may be determined based on the engine operating conditions. For example, a fueling schedule may be determined that meets the engine torque demand while also meeting the engine dilution demand and cooling demand. Upon exiting a non-fueling phase, such as a DFSO condition, a rich air fuel ratio (relative to stoichiometry) may be required to desorb the NOx trapped in the exhaust catalyst and then the NOx may react with hydrocarbons under the richer conditions to produce water and nitrogen. A richer than stoichiometric operation may be continued until the NOx load in the catalyst reduces to below a threshold load. Once the NOx load has reduced to below the threshold loading, the engine may be operated under stoichiometric (or leaner than stoichiometric) conditions. During the richer operation, when the NOx is being converted at the catalyst, further NOx adsorption capability of the catalyst may be temporarily reduced. Therefore, it may be desired to reduce further production of NOx until the NOx level in the catalyst reduces to below the threshold loading. In order to reduce further production of NOx, the peak combustion temperature may be maintained below a threshold temperature. Therefore, at least a portion of the total fuel to be delivered for combustion may be delivered via central fuel injection (CFI). As the fuel injected via the CFI atomizes in the intake manifold, charge air cooling may be achieved which reduces the peak combustion temperature. The controller may determine the amount of fuel to be injected via CFI based on peak combustion temperature. For example, the controller may determine a control signal to be sent to the CFI actuator, such as a pulse width of the signal being determined based on a determination of the peak combustion temperature. The controller may determine the pulse width through a determination that directly takes into account a determined or computed peak combustion temperature, such as increasing the pulse width with increasing peak combustion temperature. The controller may alternatively determine the pulse width based on a calculation using a look-up table with the input being peak combustion temperature and the output being pulse width. The increased manifold fuel injection may be continued until the NOx load in the catalyst reduces to below the threshold load and the engine may be operated with a leaner than stoichiometric air fuel ratio.

At 316, the routine includes determining if the oxygen content of the catalyst has increased to above a threshold amount. During engine fueling shut-off conditions, as air flows through the engine exhaust system, oxygen may be stored in the catalyst. Once the oxygen content of the catalyst increases to above a threshold, it may be inferred that the catalyst is saturated with oxygen and may not be able to further adsorb NOx.

If it is determined that the catalyst oxygen content is higher than the threshold, it may be desired to reduce further NOx production. In order to reduce the NOx production, the peak combustion temperature may be reduced by increasing charge cooling. At 318, the portion of fuel delivered via CFI may be increased to achieve a higher level of charge cooling. In one example, the controller may determine a control signal to be sent to the CFI actuator, such as a pulse width of the signal (denoting amount of fuel to be injected via CFI) being determined based on a determination of the oxygen content of the catalyst. In one example, the amount of manifold fuel injection may be increased as the oxygen content of the catalyst increases while correspondingly decreasing fuel injection via PFI and DI. Fueling via CFI may be reduced once the catalyst oxygen content reduces to below the threshold.

At 320, engine fueling may be adjusted based on estimated engine operating conditions such as engine speed, engine load, operator torque demand, etc. As an example, the amount of fuel to be injected and the fuel split between different injectors including the CFI, the DI, and the PI may be determined based on engine operating conditions. The controller may then send a pulse width corresponding to the determined fuel amount to actuators coupled to one or more corresponding fuel injectors to inject the determined amount of fuel to the cylinders.

If it is determined at 316 that the catalyst oxygen content is lower than the threshold, the routine may directly proceed to step 320 to adjust the fueling schedule based on engine operating conditions independent of the level of NOx production.

In this way, in response to an exhaust NOx level downstream of an exhaust catalyst, predicted based on engine operating conditions, being higher than a threshold level, a controller may provide a total fuel mass as a first, larger amount of fuel injected into an engine intake manifold via a central fuel injector and a second, remaining, smaller amount of fuel injected via one or more of port and direct injectors, the first amount of fuel higher than the second amount of fuel. In doing so, the charge cooling effect of manifold injection may be utilized to maintain the peak combustion temperature below a threshold temperature and reduce NOx production.

Turning now to FIG. 4, an example map 400 is shown for adjusting a fuel injection schedule, including a manifold fuel injection amount, based on a desired charge cooling effect. A higher degree of charge cooling may be desired during certain engine operating conditions for reduction of NOx production and improvement of emissions quality. For example, more charge cooling may be desired at higher combustion temperatures where there is an increase in the amount of NOx produced due to hydrocarbon combustion. The horizontal (x-axis) denotes time and the vertical markers t1-t6 identify significant times in the operation of the heat exchange system.

The first plot, line 402, shows variation in engine load as driver demand changes, the driver demand estimated via a pedal position sensor over time. Dotted line 403 denotes a threshold engine load below which fuel may be shut-off and a deceleration fuel shut-off (DFSO) event may be initiated. The second plot, line 404, shows change in exhaust catalyst temperature as estimated via an exhaust temperature sensor. Dotted line 405 shows a light-off temperature below which the catalyst may not be completely functional. The third plot, line 406, shows an engine intake manifold temperature as estimated via a manifold charge temperature sensor. Dotted line 407 shows an intake temperature above which a higher amount of NOx may be produced due to burning of hydrocarbons at elevated combustion temperature. The fourth plot, line 408, shows a DFSO event during engine operation. The fifth plot, line 410, shows catalyst oxygen content as estimated via an exhaust oxygen sensor. Dotted line 409 denotes a threshold oxygen level above which (due to oxygen saturation of the catalyst), further NOx adsorption may not take place. The sixth plot, line 412, shows a total amount of fuel to be injected using a combination of central fuel injection (CFI), direct injection (DI), and port fuel injection (PFI). The seventh plot, line 414, shows an amount of fuel delivered via CFI. The amount of fuel delivered via CFI is a fraction of the total amount of fuel to be delivered.

Prior to time t1, the engine is shut down and the vehicle is not propelled using engine torque. At time t1, in response to an operator torque demand, the engine starts from rest after a period of inactivity. At the time of the engine start, the exhaust catalyst temperature is lower than the threshold temperature 403. Based on the lower than threshold exhaust catalyst temperature, engine cold-start conditions are inferred. Between time t1 and t2, the catalyst temperature steadily increases but the temperature remains below the catalyst's light-off temperature and the catalyst is not fully activated for effective adsorption of NOx. In order to improve emissions quality during cold-start conditions, production of NOx is desired to be reduced such that NOx uncaptured by the catalyst does not get released to the atmosphere. In order to reduce NOx production, a portion of the total fuel to be injected is injected via CFI while the remaining amount of fuel is injected via port fuel injection (PFI). During manifold fuel injection, as the fuel atomizes it removes heat energy from the intake manifold thereby causing a charge cooling effect. Due to the charge cooling, the peak combustion temperature is reduced, thereby reducing the production of NOx.

At time t2, based on an increase in the catalyst temperature to its light-off temperature 405, it may be inferred that the exhaust catalyst is active. Once the catalyst is active, oxidants such as NOx and oxygen are effectively trapped in the catalyst and further adjustment of fueling schedule for reduction in NOx production may not be desired. Between time t2 and t3, the intake manifold temperature remains below the threshold temperature 407 indicating a lower rate of NOx production. Since charge cooling is not required at this time, between time t2 and t3, manifold fuel injection via CFI is reduced, for example, suspended as depicted. The total amount of fuel is delivered via one or both of direct injection and port injection. The split ratio between the DI and the PFI is determined based on engine operating conditions including engine speed, engine load, and engine temperature. As such, during higher engine load conditions, the portion of the total amount fuel delivered via DI is increased while the portion of the total amount fuel delivered via PFI is decreased.

At time t3, based on an increase in engine intake temperature to above the threshold temperature 407, it is inferred that the peak combustion temperature has increased causing an increased amount of NOx production. Therefore, in order to reduce the intake manifold temperature and thereby reduce NOx production, a larger portion of the total amount of fuel injected is delivered via CFI while a smaller, remaining portion of the total amount of fuel is delivered via PFI. Between time t3 and t4, as manifold injection is resumed, fuel vaporizes at the intake manifold and extracts heat from the manifold walls, thereby reducing the manifold temperature. The amount of fuel delivered via CFI is adjusted based on the intake temperature, the amount decreased as the intake temperature decreases.

At time t4, the engine load reduces to below the threshold load 403 and in order to increase engine fuel efficiency, a deceleration fuel shut-off (DFSO) event is initiated by shutting off fuel supply to the engine cylinders. Therefore, fueling via each of the CFI, the DI, and the PFI is suspended. During the DFSO event, as air flows through the engine system, a higher amount of oxygen is adsorbed by the catalyst. Between time t4 and t5, the oxygen content of the catalyst progressively increases. During the DFSO event, as combustion is suspended, NOx is not produced but the capacity of the catalyst may be filled due to oxygen loading.

At time t5, in response to an increase in engine load, the DFSO event is exited and fueling to the cylinders is resumed. Based on the higher than threshold oxygen level in the exhaust catalyst, it is inferred that the catalyst is saturated and is unable to further adsorb NOx from exhaust flowing through the catalyst. Therefore, it is desired to reduce the production of NOx until at least a portion of NOx and oxygen stored in the catalyst is desorbed and treated during richer than stoichiometric fueling conditions. Between time t5 and t6, a portion of the total amount of fuel injected is delivered via CFI. Due to manifold fuel injection, the fuel vaporizes in the intake manifold thereby decreasing the temperature of the intake manifold and reducing the production of NOx. The amount of fuel injected via CFI is adjusted based on catalyst oxygen content, the amount decreased as the oxygen content decreases. Fuel injection via CFI is continued until at time t6, the oxygen content of the catalyst decreases below the threshold and further adsorption of NOx by the catalyst is possible.

After time t6, the total amount of fuel is injected via one or both of DI and PFI based on engine operating conditions. As such, during lower engine load conditions, the portion of the total amount fuel delivered via PFI is increased while the portion of the total amount fuel delivered via DI is decreased. Also, if the particulate filter soot loading is higher than a threshold, the portion of the total amount fuel delivered via PFI is increased while the portion of the total amount fuel delivered via DI is decreased. Since the catalyst temperature is above the light-off temperature 405, intake temperature is below the threshold temperature 407, and the catalyst oxygen content is below the threshold 409, further reduction of NOx production by increased charge air cooling is no longer desired.

In this way, during engine operating conditions when a predicted exhaust NOx level may increase above a threshold, by opportunistically injecting at least a portion of a total amount of fuel via a central fuel injector, charge cooling may be achieved to reduce production of NOx and maintain the actual exhaust NOx level below the threshold. By increasing manifold fuel injection, the corresponding charge cooling effect may be may be leveraged to decrease NOx production during cold-start conditions when the exhaust catalyst is not able to optimally adsorb and treat NOx. The technical effect of injecting fuel via CFI upon exit from a fuel shut-down event when the catalyst may be saturated with oxygen is that NOx production level may be lowered until the oxygen loading in the catalyst decreases and further NOx adsorption may resume. Overall, by providing manifold cooling and regulating NOx production, engine performance, fuel efficiency, and emissions quality may be improved.

Figure 5:
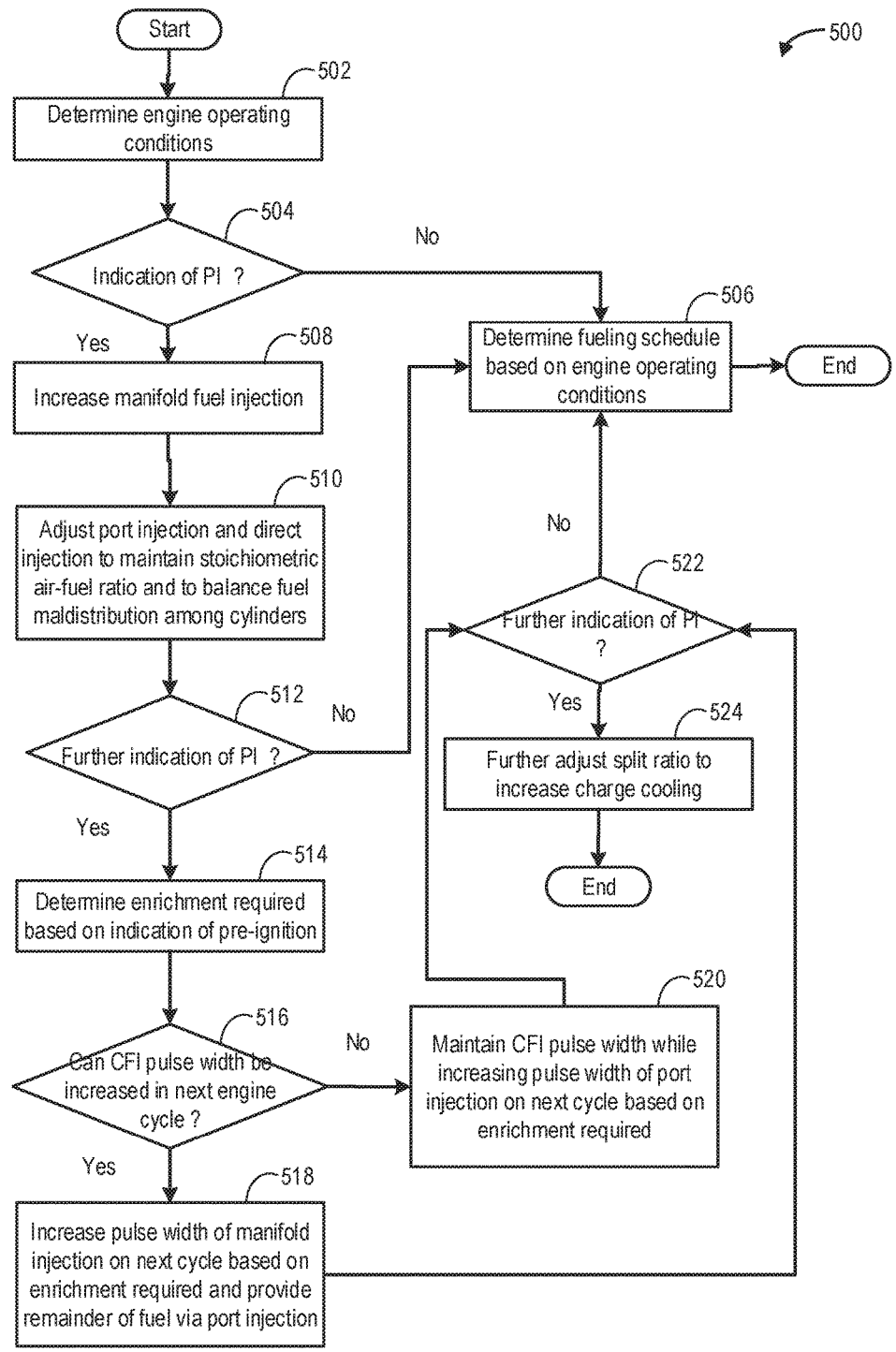
FIG. 5 shows a flow chart illustrating an example method for adjusting a fuel injection schedule upon indication of cylinder pre-ignition.

FIG. 5 illustrates an example method 500 that may be implemented for adjusting a fuel injection schedule upon indication of a cylinder pre-ignition. The method enables utilizing the increased charge cooling of manifold fuel injection for reduction in combustion temperature and mitigation of pre-ignition.

At 502, the routine includes estimating and/or sensing engine operating conditions including, for example, driver torque demand, engine temperature, engine load, engine speed, manifold charge temperature, exhaust temperature, ambient conditions including ambient temperature, pressure, and humidity, manifold pressure and air flow, boost pressure, exhaust air/fuel ratio, EGR flow, etc.

In some embodiments, a pre-ignition history of the engine may also be retrieved from a look-up table stored in the controller's memory. The look-up table may be updated at regular intervals (e.g., every engine cycle, every 50 miles, every hour, etc.), or in response to an occurrence of cylinder pre-ignition. The engine pre-ignition (PI) count may include a PI count for each cylinder may include details such as an estimate of a total number of pre-ignition events in the cylinder over the present trip, or engine cycle (e.g., a cylinder trip PI count). The engine PI count may further include an estimate of the total number of pre-ignition events in the cylinder over the lifetime of engine operation (e.g., cylinder lifetime PI count). As such, each cylinder's PI count may represent the given cylinder's pre-ignition history, and may correlate with each cylinder's propensity for further pre-ignition events.

At 504, it may be determined if there is an indication of pre-ignition. In one example, the indication of pre-ignition includes the detection of an actual pre-ignition event, though in other examples, the indication may include the determination of a likelihood of pre-ignition (before the pre-ignition event actually occurs). An engine controller may detect abnormal combustion events related to pre-ignition, and differentiate them from cylinder knocking events, based on the output of one or more engine knock sensors. As one example, an indication of pre-ignition may be confirmed in response to the output of the knock sensor, estimated in a window before a spark ignition event, being higher than a threshold.

If it is determined that there is no indication of pre-ignition, at 506, a fueling schedule may be determined based on the engine operating conditions such as engine load, engine speed, engine temperature etc. For example, a total amount of fuel to be injected into the engine to meet the torque demand may be determined. As the torque demand increases, the total amount of fuel to be injected may be increased. In one example, the controller may use a look-up table to determine the amount of fuel to be injected. A plurality of engine operating conditions such as engine speed, engine load, and torque demand may be used as input and the total amount of fuel to be injected may be the output. As another example, the controller may make a logical determination regarding a total amount of fuel to be injected based on logic rules that are a function of engine speed, engine load, and torque demand. The total amount of fuel to be injected may include fuel to be injected via one or more of a direct injector (such as DI 47 of FIG. 1), a port injector (such as PFI 48 of FIG. 1), and a central fuel injector (such as CFI 46 of FIG. 1). The controller may generate pulse width signals that are sent to the one or more fuel injectors. Based on engine speed-load conditions, there may be a threshold percentage of the portion of fuel delivered via CFI relative to the portion of fuel delivered via port injection and/or direct injection. Therefore, the portion of fuel delivered via CFI may be limited to within the threshold percentage. In one example, during high engine speed and higher than threshold engine load conditions, a maximum of 80% of the total amount of fuel delivered may be delivered via CFI while the remaining 20% of the total amount of fuel may be delivered via DI and/or PFI. Details about the threshold percentage of fuel delivered via CFI based on engine speed-load conditions is discussed in FIG. 6.

At 508, if it is determined that there is an indication of pre-ignition, at 509, a first amount of fuel delivered via CFI relative to the amount of fuel delivered via DI and/or PFI may be increased. In one example, increasing the amount of manifold injection includes increasing the pulse width of the CFI. The controller may determine the pulse width based on a calculation using a look-up table with the input being engine operating conditions and the output being pulse width. The portion of fuel delivered via CFI may be limited to not exceed a threshold percentage determined based on engine operating conditions. Due to the upstream location of the injection, the amount of fuel delivered via CFI is substantially equally distributed among all engine cylinders. An increase in manifold injection may result in increased charge cooling. Therefore, by increasing manifold charge cooling, a pre-ignition tendency of each of the engine cylinders may be reduced. By injecting an increased amount of fuel via CFI, charge cooling properties of manifold injection can be better leveraged for pre-ignition mitigation without increasing the total amount of fuel delivered, thereby improving fuel efficiency. Following an indication of pre-ignition, increased fuel delivery via CFI may be continued for a first number of engine cycles or for a first duration immediately after the indication of pre-ignition with no engine cycles or duration in between. In one example, the first number of engine cycles or the first duration may be based on the output of the knock sensor, the first number of engine cycles or the first duration increased as the output of the knock sensor increases above the threshold output. In another example, the first number of engine cycles or the first duration may be decreased as the output of the knock sensor decreases below the threshold output.

At 510, during the first number of engine cycles or during the first duration following an indication of pre-ignition, a second, remaining, amount of fuel may be delivered via port injection and/or direct injection. The amount of fuel delivered via port injection and/or direct injection may be adjusted to maintain a target (such as stoichiometric) air-fuel ratio. Also, as the fuel injected via CFI is distributed to each of the engine cylinders, there may be maldistribution among cylinders caused by geometrical differences between the cylinders. A maldistribution of fuel injected via the central fuel injector among a plurality of cylinders including the pre-igniting cylinder may be estimated based on the amount of fuel injected via CFI and the geometry of the plurality of cylinders. In one example, the controller may use a look-up table to determine the distribution of fuel among each of the plurality of cylinders. As fuel maldistribution may lead to an increased propensity for knock, maldistribution of fuel may also be learned based on the knock history of each cylinder. The amount of fuel injected via CFI may be the input and the amount of the manifold injected fuel received by each cylinder may be the output of the look-up table. In one example, a first cylinder of the plurality of cylinders may receive a smaller portion of the amount of fuel delivered via CFI relative to a larger portion of fuel received by each remaining cylinder of the plurality of cylinders. The amount of fuel injected via one or more of the port injector and the direct injector may be adjusted based on the estimated maldistribution. For example, in response to the first cylinder receiving a smaller portion of fuel, direct injection (and/or port injection) of fuel to the first cylinder may be increased relative to direct injection (and/or port injection) of fuel to each of the remaining cylinders of the plurality of cylinders.

The amount of fuel delivered via PFI to the amount of fuel delivered via DI may also be determined based on a particulate matter (PM) loading in an exhaust particulate matter filter. Direct fuel injection generates more particulate matter (or soot) due to diffuse flame propagation wherein fuel may not adequately mix with air prior to combustion. Therefore, if the PM loading on the particulate matter filter is higher than a threshold, the amount of fuel delivered via DI may be reduced and the amount of fuel delivered via CFI may be correspondingly increased. In this way, emissions quality may be improved while increasing charge cooling and mitigating pre-ignition.

At 512, upon completion of the first number of engine cycles with increased manifold fuel injection or after the first duration has elapsed, it is determined if there is any further indication of pre-ignition. In one example, further indication of pre-ignition may be detected during the first number of engine cycles or during the first duration. The further indication of pre-ignition may be detected in the previously pre-igniting cylinder or in any of the remaining engine cylinders. For example, it may be determined if there is a burst of pre-ignition events that were not sufficiently mitigated via the initial increase in manifold injection and fuel injection adjustment. If no further pre-ignition is determined, nominal cylinder fueling based on engine operating conditions may be resumed at 506. In addition, the split fuel injection ratio applied during the preceding pre-ignition mitigation may be learned and the split fuel ratio look-up table may be updated. If further pre-ignition is detected, then at 514, a pre-ignition mitigating enrichment may be determined. Specifically, an amount of fuel that is required to enrich the pre-igniting cylinder and mitigate the pre-ignition indication is determined. The enrichment may include a degree of richness as well as a number of enrichment cycles. The enrichment may be increased as the indication of pre-ignition increases. For example, as the knock sensor output exceeds the pre-ignition threshold, the degree of richness of the enrichment and/or the number of enrichment cycles applied may be increased.

At 516, it may be determined if at least a portion of the enrichment on the engine cycle immediately following the engine cycle where pre-ignition was detected can be provided via manifold injection. In particular, it may be determined if the pulse width of the CFI can be increased during the immediately next engine cycle. A pulse width of the CFI may be determined as a function of a pulse width limit of the CFI at a current engine speed-load condition. In one example, if the pulse width of the CFI is not already at the limit (based on current engine speed-load conditions), then further manifold injection may be possible. Else, if the CFI pulse width is at the limit, no further manifold injection may be possible.

If further manifold injection is possible, then at 518, in response to the indication of pre-ignition, the routine includes enriching the fuel injection by adjusting air-fuel ratio to be richer than stoichiometry and then increasing the amount of fuel delivered via CFI relative to the amount of fuel delivered via PFI/DI, following the detection of pre-ignition. As elaborated below, the amount of fuel delivered via manifold injection, port injection, and direct injection may be increased, the increasing adjusted so that the effective increase in manifold injection for the engine cycle immediately following the detection of pre-ignition is higher than the effective increase for port injection/direct injection for that engine cycle, and thereby the split ratio for manifold injection relative to port injection/direct injection is increased for at least that engine cycle.

In one example, increasing the amount of manifold injection includes increasing the pulse width of the CFI. For example, to leverage maximum possible benefit of manifold charge cooling, the CFI may be operated at the upper limit based on the engine speed-load conditions. A remainder of the determined enrichment on the given engine cycle may be provided via PFI or DI. Fueling via PFI and/or DI may be adjusted to account for the maldistribution of fuel following the manifold fuel injection. In one example, enriched fueling operation may be continued for a second number of engine cycles following the detection of pre-ignition. Each of the degree of fuel enrichment over the second number of engine cycles and the second number of engine cycles may be based on the output of the knock sensor relative to the threshold output. In one example, each of the degree of enrichment and the second number of engine cycles may be increased as the output of the knock sensor exceeds the threshold output. In another example, each of the degree of enrichment and the second number of engine cycles may be decreased as the output of the knock sensor reduces below the threshold output.

If it is determined at 516 that the CFI pulse width may not be increased any further, the routine may proceed to 520, wherein the pulse width of the manifold injection may be maintained at the highest possible limit (based on current engine speed-load conditions) and the enriching the pre-igniting cylinder may be carried out by increasing the split ratio of fuel that is delivered to the cylinder via a port injector on an open intake valve relative to fuel delivered to the cylinder by a direct injector for the second number of engine cycles immediately following the detection of pre-ignition. The amount of fuel delivered via both port injection and direct injection may be increased, the increasing adjusted so that the effective increase in port injection for the engine cycle immediately following the detection of pre-ignition is higher than the effective increase for direct injection for that engine cycle. Also, a ratio of fuel delivered via port injection relative to fuel delivered via direct injection may be based on a particulate matter load of an exhaust particulate matter filter coupled to an exhaust passage. Since direct fuel injection may cause an increase in particulate matter generation, the ratio of fuel delivered via port injection relative to direct injection may be increased when the particulate matter load on the particulate matter filter is higher than a threshold. In one example, increasing the ratio of port injection includes increasing the pulse width of the port injector and delivering the port injected fuel on an open intake valve. A remainder of the determined enrichment on the given engine cycle may be provided via the direct injector on the intake stroke.

From 518 and 520, the routine proceeds to 522 wherein after the second number of engine enrichment cycles have elapsed, it is determined if there is any further indication of pre-ignition. If no further pre-ignition is determined, nominal cylinder fueling based on engine operating conditions may be resumed at 506. If further pre-ignition is detected, then at 524, the routine includes further adjusting the split fuel injection ratio to further increase cylinder charge cooling. Since the CFI pulse width may not be further increased beyond the threshold limit, an amount of fuel delivered via port injection and direct injection may be adjusted. In one example, direct injection may be increased while the amount of fuel delivered via port injection may be correspondingly decreased. In addition, the revised split fuel injection ratio may be learned and the split fuel ratio look-up table may be updated.

In this way, in response to a first indication of pre-ignition in a cylinder, the engine may be operated with a stoichiometric air-fuel ratio for a first number of engine cycles; and in response to a second indication of pre-ignition in the cylinder following the first indication of pre-ignition, the engine may be operated with a richer than stoichiometric air-fuel ratio for a second number of engine cycles, wherein the operating responsive to both the first and second indication of pre-ignition includes providing a total fuel mass as a first amount of fuel injected into an engine intake manifold via a central fuel injector and a second, remaining amount of fuel injected via one or more of a port and a direct injector, the first amount higher than the second amount.

It will be appreciated that while the method of FIG. 5 is described with reference to pre-ignition mitigation, it may also be used, with modifications, so as to leverage the charge cooling of a manifold injection for mitigation of knock. A cylinder knock event may be detected based on input from a knock sensor during a window after the spark ignition event. In one example, the windows in which the knock signals are estimated may be crank angle windows. In response to a knock event, the pulse width of the central fuel injector may be increased to increase charge cooling until the tendency for further occurrence of knock is reduced. In one example, the pulse width of the central fuel injector may be increased to the threshold pulse width (corresponding to engine speed and engine load conditions). As such, the increase in manifold injection responsive to a pre-ignition event may be larger compared to the increase in manifold injection responsive to a knock event. The increase in manifold injection ratio may be used in addition to, or in place of, the use of spark retard. In one example, by increasing the ratio of fuel delivered via manifold injection responsive to an indication of knock, the amount of spark retard that needs to be applied for knock mitigation can be reduced. As a further example, responsive to the indication of knock, manifold injection may be increased until the limit while spark timing is maintained, and thereafter, while maintaining manifold injection at the limit, spark timing may be retarded to mitigate knock.

FIG. 6 shows a first example map 600 of desired ratio of fuel injected via central fuel injection (CFI) to fuel injected via a combination of port fuel injection (PFI) and direct injection (DI), based on engine operating conditions. The x-axis of the map denotes engine load (in percentage) and the y-axis of the map denotes engine speed (in rotations per minute).

At each engine speed and engine load, a threshold (e.g., maximum) amount (or percentage) of fuel may be injected via CFI while the remaining amount (or percentage) of the total amount of fuel may be injected via a combination of PFI and DI. The maximum percentage of fuel delivered via CFI may be further affected by conditions such as engine temperature and dilution demand. The threshold amount of fuel to be injected via CFI injection may be based on the volatility and vapor pressure properties of the fuel being injected. The volatility and vapor pressure properties of a fuel may be based on the manifold charge temperature and the fuel composition such as the amount of ethanol (alcohol) present in the fuel. In one example, with an increase in the ethanol content in the fuel, the volatility of the fuel decreases. In another example, with a decrease in the ethanol content in the fuel, the volatility of the fuel increases. The fuel ethanol level may be estimated based on input from an alcohol level sensor coupled to the fuel system. The controller may determine the evaporation behavior (such as evaporation rate) of the fuel using a look-up table with the input being each of a fuel ethanol content (fuel composition) and a manifold charge temperature, and the output being the fuel evaporation rate. In addition, the change in manifold charge temperature after a CFI fuel injection may be used as a feedback signal to estimate the amount of fuel that has evaporated after the fuel injection.

The amount of fuel delivered via CFI is distributed to each of the cylinders. The amount of fuel delivered via PFI and DI may be adjusted to maintain a desired air-fuel ratio. Also, the amount of fuel delivered via PFI and DI to each cylinder may be adjusted to balance maldistribution of fuel injected via CFI due to geometrical differences among cylinders. For a given engine speed and engine load, it is desired to maintain the percentage of fuel injected via CFI within the threshold percentage such that the remaining percentage of fuel delivered via PFI and DI may be utilized effectively to maintain a desired air-fuel ratio and to balance fuel distribution among all engine cylinders for each engine cycle.

In one example, at lower engine speed and lower engine load conditions, denoted by point 602, a maximum of 20% of the total amount of fuel injected for combustion during each engine cycle may be delivered via CFI while the remaining 80% of the total amount of fuel injected may be delivered via a combination of PFI and DI. At middle engine speed and lower engine load conditions, denoted by point 604, a maximum of 30% of the total amount of fuel injected may be delivered via CFI while the remaining 70% of the total amount of fuel injected may be delivered via a combination of PFI and DI. At higher engine speed and lower engine load conditions, denoted by point 606, a maximum of 40% of the total amount of fuel injected may be delivered via CFI while the remaining 60% of the total amount of fuel injected may be delivered via a combination of PFI and DI.

In another example, at lower engine speed and middle engine load conditions, denoted by point 608, a maximum of 50% of the total amount of fuel injected for combustion during each engine cycle may be delivered via CFI while the remaining 50% of the total amount of fuel injected may be delivered via a combination of PFI and DI. At middle engine speed and middle engine load conditions, denoted by point 610, a maximum of 60% of the total amount of fuel injected may be delivered via CFI while the remaining 40% of the total amount of fuel injected may be delivered via a combination of PFI and DI. At higher engine speed and middle engine load conditions, denoted by point 612, a maximum of 70% of the total amount of fuel injected may be delivered via CFI while the remaining 30% of the total amount of fuel injected may be delivered via a combination of PFI and DI.

In yet another example, at lower engine speed and higher engine load conditions, denoted by point 614, a maximum of 70% of the total amount of fuel injected for combustion during each engine cycle may be delivered via CFI while the remaining 30% of the total amount of fuel injected may be delivered via a combination of PFI and DI. At middle engine speed and higher engine load conditions, denoted by point 616, a maximum of 75% of the total amount of fuel injected may be delivered via CFI while the remaining 25% of the total amount of fuel injected may be delivered via a combination of PFI and DI. At higher engine speed and higher engine load conditions, denoted by point 618, a maximum of 80% of the total amount of fuel injected may be delivered via CFI while the remaining 20% of the total amount of fuel injected may be delivered via a combination of PFI and DI.

FIG. 7 shows a second example map 700 of desired ratio of fuel injected via central fuel injection (CFI) to fuel injected via a combination of port fuel injection (PFI) and direct injection (DI), based on engine operating conditions. The x-axis of the map 700 denotes engine speed (in rpm) and the y-axis of the map denotes brake mean effective pressure (BMEP in bar). The brake mean effective pressure may be an indication of engine load.

At each engine speed and BMEP, a first threshold (e.g., maximum) amount (or percentage) of fuel may be injected via DI, a second threshold (e.g., maximum) amount (or percentage) of fuel may be injected via PFI, and a third threshold (e.g., maximum) amount (or percentage) of fuel may be injected via CFI. The maximum percentage of fuel delivered via CFI may be affected by conditions such as engine temperature and dilution demand and the volatility and vapor pressure properties of the fuel being injected. As described before, the volatility and vapor pressure properties of the fuel may be based on fuel composition such as the amount of ethanol (alcohol) present in the fuel and the manifold charge temperature.

In one example, at lower engine speed (such as below 3000 rpm) and lower engine BMEP (such as below 7 bar) conditions, in a first region denoted by 702, a maximum of 2% of the total amount of fuel injected for combustion during each engine cycle may be delivered via CFI while 98% of the total amount of fuel injected may be delivered via PFI and 0% of the total amount of fuel injected may be delivered via DI. At higher engine speed (such as above 3000 rpm) and lower engine BMEP (such as below 7 bar) conditions, in a second region denoted by 704, a maximum of 2% of the total amount of fuel injected for combustion during each engine cycle may be delivered via CFI while 80% of the total amount of fuel injected may be delivered via PFI and 18% of the total amount of fuel injected may be delivered via DI.

In another example, at all engine speeds and middle engine BMEP (such as between 7 bar and 17 bar) conditions, in a third region denoted by 706, a maximum of 5% of the total amount of fuel injected for combustion during each engine cycle may be delivered via CFI while 50% of the total amount of fuel injected may be delivered via PFI and 45% of the total amount of fuel injected may be delivered via DI.

In yet another example, at lower engine speed (such as below 3000 rpm) and higher engine BMEP (such as above 17 bar) conditions, in a fourth region denoted by 708, a maximum of 5% of the total amount of fuel injected for combustion during each engine cycle may be delivered via CFI while 50% of the total amount of fuel injected may be delivered via PFI and 45% of the total amount of fuel injected may be delivered via DI. At higher engine speed (such as above 3000 rpm) and higher engine BMEP (such as above 17 bar) conditions, in a fifth region denoted by 710, a maximum of 10% of the total amount of fuel injected for combustion during each engine cycle may be delivered via CFI while 20% of the total amount of fuel injected may be delivered via PFI and 80% of the total amount of fuel injected may be delivered via DI.

In this way, based on engine operating conditions, the total amount of fuel to be injected may be split among the three injectors.

FIG. 8 shows an example map 800 of pre-ignition mitigating fueling adjustments. Map 800 illustrates an engine position along the x-axis in crank angle degrees (CAD). Curve 808 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 808, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 802 and 804 depict valve timings for an exhaust valve (dashed curve 802) and an intake valve (solid curve 804) during engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 806 (or simply, positive valve overlap), represented by a hatched region at the intersection of curves 802 and 804. In one example, the positive intake to exhaust valve overlap 806 may be a default cam position of the engine present during an engine cold start.

Fuel injection profile 810 depicts an example fuel injection profile that may be used in response to no indication of pre-ignition. Herein, a fuel split ratio is adjusted based on nominal engine operating conditions. An engine controller is configured to provide the total amount of fuel to the cylinder as a first manifold injection via a central fuel injector (CF1, hatched block), and a second port injection via a port fuel injector (PF2, diagonally striped block). The first manifold injection includes a first portion of fuel (CFI1) that is manifold injected at a first timing CAD1. In particular, the first portion of fuel is port injected during a closed intake valve event (that is, during the exhaust stroke). Then, a remaining portion of the fuel is port injected (P2) as an intake stroke injection at CAD2. It will be appreciated that in other examples, a portion of the total amount of fuel may be direct injected as a single compression stroke injection, as multiple intake stroke injections, as multiple compression stroke injections, or a combination of at least one intake and at least one compression stroke injection. Spark (star) is provided during the compression stroke. The fuel amount P2 is adjusted based on intake airflow so that combustion air-fuel ratio is at or around stoichiometry. As one example, fuel is delivered at a ratio of 30% manifold injection (CFI1): 70% port injection (P2).

Fuel injection profile 820 depicts an example fuel injection profile that may be used in response to a first indication of pre-ignition 822. Herein, pre-ignition may be detected during the preceding combustion cycle as an abnormal combustion event (or a series of abnormal combustion events) occurring before a cylinder spark event. In response to pre-ignition 822 being detected in combustion cycle 1, fuel injection is adjusted in combustion cycle 2 to increase charge cooling. Charge cooling may be leveraged by increasing the amount of fuel delivered via CFI. In the depicted example, the CFI pulse width may not be limited and a further increase in CFI pulse width may be possible. Accordingly, the fuel split ratio is adjusted on combustion cycle 2 to increase the amount of fuel delivered via manifold injection during a closed intake valve event (that is, during the exhaust stroke) while decreasing the amount of fuel delivered via port injection in an intake stroke such that the total amount of fuel delivered during the engine cycle is not increased. An engine controller is configured to provide the total amount of fuel (without enrichment) as a first manifold injection (CFI11, hatched block), and a second port injection (P12, diagonally striped block). The total fuel delivered via the enrichment (CFI11+P12) may be equal to the amount of fuel delivered before the indication of pre-ignition (CFI1+P2). The first port injection includes a first portion of fuel (CFI11) that is manifold injected at a first timing CAD11. Then, a remaining portion of the fuel is port injected as an intake stroke injection P12 at CAD12. Spark (star) is provided during the compression stroke. The fuel amount P12 is adjusted based on intake airflow so that combustion air-fuel ratio is at or around stoichiometry. As one example, fuel is delivered at a ratio of 70% manifold injection (CFI11): 30% port injection (P12).

Fuel injection profile 830 depicts an example fuel injection profile that may be used in response to a second indication of pre-ignition 832. Herein, pre-ignition may be detected for a second time during two consecutive engine cycles occurring before a cylinder spark event. In response to pre-ignition 832 being detected in combustion cycle 1, fuel injection is adjusted in combustion cycle 2 to enrich the cylinder. In addition, a fuel split ratio is immediately adjusted. In particular, a pre-ignition mitigating enrichment (e.g., degree of richness) may be determined based on the intensity of the pre-ignition event. For example, as the intensity increases, the degree of richness of the mitigating enrichment may be increased. At least a portion of the enrichment may then be provided via the CFI, allowing the charge cooling properties of manifold injection to be leveraged. The pulse width of CFI may be increased to the maximum threshold. Accordingly, the fuel split ratio is adjusted on combustion cycle 2 to increase the amount of fuel delivered via manifold injection in an exhaust stroke while also increasing the amount of fuel delivered via port injection in an intake stroke. An engine controller is configured to provide the total amount of fuel enrichment to the cylinder as a first manifold injection (CFI21, hatched block), and a second port injection (P22, diagonally striped block). The total fuel delivered via the enrichment (CFI21+P22) may be twice the amount of fuel delivered after the first of pre-ignition (CFI11+P12). The first manifold injection includes a first portion of fuel (CFI21) that is manifold injected at a first timing CAD21. Then, a remaining portion of the fuel is port injected as an intake stroke injection P22 at CAD22. As one example, fuel enrichment is delivered at a ratio of 33% manifold injection (CFI21): 67% port injection (P22). Herein, the change in port injection amount (P12 to P21) is higher than the change in manifold injection amount (CFI11 to CFI22). In one example, at CFI11, the CFI is operating below the pulse width (upper) limit while at CFI21, the CFI is operating at the pulse width (upper) limit. Spark (star) is provided during the compression stroke. The fuel ratio of CFI22 and P22 is then further adjusted on a number of subsequent combustion cycles to provide charge cooling while combustion air-fuel ratio is held at richer than stoichiometry. In this way, pre-ignition is indicated in a first engine cycle, and a pre-ignition mitigating enrichment with an increased ratio of manifold fuel injection is performed on a second engine cycle immediately following the first engine cycle.

In this way, in response to a first and a subsequent second indication of pre-ignition in a cylinder, the ratio of fuel delivered via the central fuel injector relative to the direct injector may be increased towards a threshold pulse width while correspondingly decreasing a pulse width of the direct injector, and after the pulse width of the central fuel injector is at the threshold pulse width, maintaining the pulse width of the central fuel injector at the threshold pulse width and increasing the pulse width of one of the port and direct injector.

In this way, the charge cooling properties of a manifold fuel injection may be leveraged for pre-ignition mitigation, as well as for reducing NOx formation during selected engine operating conditions. The technical effect of increasing an amount of fuel delivered via central fuel injection responsive to an indication of pre-ignition is that the charge cooling provided by the manifold injection can be used in order to mitigate pre-ignition, reducing the need for cylinder enrichment, improving fuel economy. By reducing the reliance on cylinder enrichment and charge cooling provided via direct injection, production of undesired exhaust particulate matter due to increased direct injection may be reduced. Also, the manifold charge cooling effect may be leveraged by each engine cylinder, including a pre-ignition-affected cylinder, thereby decreasing the possibility of occurrence of pre-ignition in all engine cylinders. Overall, upon indication of pre-ignition, by increasing the amount of fuel injected via manifold injection relative to port injection and/or direct injection, overall charge cooling may be achieved with improved improving fuel efficiency and emissions quality.

An example method comprises: in response to an indication of pre-ignition, selectively increasing a first portion of fuel delivered to the engine via manifold injection relative to a second portion of fuel delivered to the engine via one or more of port and direct injection while maintaining an air-fuel ratio from before the indication of pre-ignition. In any preceding example, additionally or optionally, the maintaining the air-fuel ratio includes maintaining the air-fuel ratio at or around stoichiometry. In any or all of the preceding examples, additionally or optionally, selectively increasing the first portion of manifold injected fuel includes selectively increasing a pulse width of a central fuel injector coupled to an engine intake manifold while correspondingly decreasing a pulse width of one or more of a direct injector and a port injector. In any or all of the preceding examples, additionally or optionally, decreasing the pulse width of the one or more of the direct injector and the port injector includes, in the second portion of fuel, adjusting a ratio of fuel delivered via port injection relative to fuel delivered via direct injection based on a particulate matter load of an exhaust particulate matter filter coupled to an exhaust passage, the adjusting including increasing the ratio of fuel delivered via port injection relative to direct injection when the particulate matter load on the particulate matter filter is higher than a threshold. In any or all of the preceding examples, additionally or optionally, increasing the pulse width of the central fuel injector includes increasing the pulse width of the central fuel injector until an operating limit of the central fuel injector is reached, and thereafter maintaining the pulse width of the central fuel injector at the operating limit while increasing the pulse width of one or more of the port injector and the direct injector. In any or all of the preceding examples, additionally or optionally, the indication of pre-ignition includes a higher than threshold output of a knock sensor coupled to a cylinder, estimated in a first crank angle window before a spark ignition event of the cylinder. In any or all of the preceding examples, additionally or optionally, the selectively increasing includes increasing the first portion of fuel delivered to the engine via manifold injection relative to the second portion of fuel delivered to the engine via one or more of port and direct injection for a first number of engine cycles immediately after the indication of pre-ignition with no engine cycles in between, and during the first number of engine cycles, maintaining the air-fuel ratio at or around stoichiometry. In any or all of the preceding examples, additionally or optionally, the first number of engine cycles is based on the output of the knock sensor, the first number of engine cycles increased as the output of the knock sensor increases above the threshold output. Any or all of the preceding examples further comprising, additionally or optionally, in response to a further indication pre-ignition after completion of the first number of engine cycles, further increasing the first portion of fuel delivered to the engine via manifold injection relative to the second portion of fuel delivered to the engine via one or more of port and direct injection and operating the engine at a richer than stoichiometry exhaust air fuel ratio for a second number of engine cycles. In any or all of the preceding examples, additionally or optionally, operating the engine richer than stoichiometry includes adjusting a degree of fuel enrichment over the second number of engine cycles based on the output of the knock sensor relative to the threshold output, the degree of enrichment increased as the output of the knock sensor exceeds the threshold output.

Another example method comprises: in response to a first indication of pre-ignition in a cylinder, operating the engine with a stoichiometric air-fuel ratio for a first number of engine cycles; and in response to a second indication of pre-ignition in the cylinder following the first indication of pre-ignition, operating the engine with a richer than stoichiometric air-fuel ratio for a second number of engine cycles, wherein the operating responsive to both the first and second indication of pre-ignition includes providing a total fuel mass as a first amount of fuel injected into an engine intake manifold via a central fuel injector and a second, remaining amount of fuel injected via one or more of a port and a direct injector, the first amount higher than the second amount. In any of the preceding examples, additionally or optionally, the second indication of pre-ignition occurs within the first number of engine cycles. In any or all of the preceding examples, additionally or optionally, providing a total fuel mass as a first amount injected via a central fuel injector includes increasing a pulse width of the central fuel injector to deliver the first amount of fuel, wherein the first amount of fuel is determined as a function of a pulse-width limit of the central fuel injector at a current engine speed-load condition. In any or all of the preceding examples, additionally or optionally, the providing includes, in response to each of the first and the second indication of pre-ignition, increasing the first amount of fuel until the pulse-width of the central fuel injector reaches the limit, and then maintaining the pulse-width of the central fuel injector, and increasing a pulse width of one or more of the port injector and the direct injector to deliver the second, remaining amount of fuel. In any or all of the preceding examples, additionally or optionally, operating the engine with a richer than stoichiometric air-fuel ratio includes enriching a total fuel injection during the second number of engine cycles based on a difference between an output of a knock sensor and a pre-ignition threshold, a degree of the enrichment increased as the difference increases. Any or all of the preceding examples further comprising, additionally or optionally, estimating a maldistribution of the first amount of fuel injected via the central fuel injector among a plurality of cylinders including the pre-igniting cylinder, wherein the maldistribution includes a first cylinder of the plurality of cylinders receiving a smaller portion of the first amount of fuel relative to a larger portion of fuel received by each remaining cylinder of the plurality of cylinders. In any or all of the preceding examples, additionally or optionally, the second amount of fuel injected via one or more of the port injector and the direct injector is adjusted based on the estimated maldistribution, the adjusting including increasing direct injection of fuel to the first cylinder relative to direct injection of fuel to each of the remaining cylinders of the plurality of cylinders.

In yet another example, an engine system comprises: an engine intake manifold; an engine cylinder; a direct injector configured to direct inject a fuel into the cylinder; a port injector configured to port inject the fuel into the cylinder; a central fuel injector to inject the fuel into the engine intake manifold, upstream of the cylinder; a knock sensor coupled to the cylinder; and a controller with computer-readable instructions stored on non-transitory memory for: indicating pre-ignition, different from knocking, in the cylinder responsive to on an output of the knock sensor in a first crank angle window, before a spark ignition event of the cylinder, being larger than a pre-ignition threshold; and in response to the indication of pre-ignition, selectively increasing a ratio of fuel delivered to the cylinder via the central fuel injector relative to the direct injector for a first duration, while operating the cylinder with a stoichiometric air-fuel ratio. In any preceding example, additionally or optionally, the indication of pre-ignition is a first indication, and wherein the controller contains further instructions for: in response to a second indication of pre-ignition in the cylinder, sensed after the first duration, further increasing the ratio of fuel delivered via the central fuel injector relative to the direct injector while operating the cylinder with a richer than stoichiometric air-fuel ratio for a second duration. In any or all of the preceding examples, additionally or optionally, further increasing the ratio of fuel delivered via the central fuel injector includes increasing a pulse width of the central fuel injector towards a threshold pulse width while correspondingly decreasing a pulse width of the direct injector, and after the pulse width of the central fuel injector is at the threshold pulse width, maintaining the pulse width of the central fuel injector at the threshold pulse width and increasing the pulse-width of the direct injector.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

A further example method comprises: adjusting a first portion of fuel delivered to an engine via manifold injection relative to a second portion of fuel delivered to the engine via one or more of port and direct injection based on an estimated oxygen content of an exhaust catalyst, the estimated oxygen content estimated immediately after a fuel shut-off event. In any preceding example, additionally or optionally, the adjusting includes increasing the first portion of fuel delivered to the engine via manifold injection while correspondingly decreasing the second portion of fuel delivered via the one or more of port and direct injection in response to the estimated oxygen content of the exhaust catalyst increasing above a threshold oxygen content. In any or all of the preceding examples, additionally or optionally, the adjusting further includes, maintaining engine operation with the increased first portion of fuel and the decreased second portion of fuel until the estimated oxygen content of the exhaust catalyst falls below the threshold oxygen content, and then decreasing the first portion of fuel delivered to the engine via manifold injection while correspondingly increasing the second portion of fuel delivered via the one or more of port and direct injection. In any or all of the preceding examples, additionally or optionally, the adjusted first portion of fuel delivered to the engine via manifold injection is based on the estimated oxygen content of the exhaust catalyst, the first portion increased as the estimated oxygen content of the exhaust catalyst increases above the threshold oxygen content. In any or all of the preceding examples, additionally or optionally, the second portion of fuel delivered via the one or more of port and direct injection is adjusted based on the first portion to maintain an exhaust air-fuel ratio. In any or all of the preceding examples, additionally or optionally, the adjusting further includes, in the second portion of fuel, adjusting a ratio of fuel delivered via port injection relative to fuel delivered via direct injection based on a particulate matter load of an exhaust particulate matter filter coupled upstream/downstream of the exhaust catalyst, the adjusting including increasing the ratio of fuel delivered via direct injection relative to port injection when the particulate matter load on the particulate matter filter is lower than a threshold. In any or all of the preceding examples, additionally or optionally, the increasing the first portion of fuel includes increasing the first portion of fuel delivered to an engine via manifold injection relative to the second portion of fuel delivered via one or more of port and direct injection for a first number of engine cycles immediately after the fuel shut-off event, and during the first number of engine cycles, operating the engine with a richer than stoichiometric exhaust air-fuel ratio. In any or all of the preceding examples, additionally or optionally, the first number of engine cycles is based on an exhaust catalyst oxygen loading, the first number of cycles increased as the exhaust catalyst oxygen loading increases. In any or all of the preceding examples, additionally or optionally, the fuel shut-off event includes a deceleration fuel shut off event responsive to a lower than threshold operator torque demand. In any or all of the preceding examples, additionally or optionally, the fuel shut-off event includes a transient fuel shut-off event responsive to a transmission gear upshift. Any or all of the preceding examples further comprising, additionally or optionally, in response to a higher than threshold engine intake manifold temperature, increasing the first portion of fuel delivered to the engine via manifold injection while correspondingly decreasing the second portion of fuel delivered via the one or more of port and direct injection until the engine intake manifold temperature decreases below the threshold engine intake manifold temperature. Any or all of the preceding examples further comprising, additionally or optionally, in response to a lower than threshold exhaust catalyst temperature, increasing the first portion of fuel delivered to the engine via manifold injection while correspondingly decreasing the second portion of fuel delivered via the one or more of port and direct injection until the exhaust catalyst temperature increases above the threshold exhaust catalyst temperature.

Another further example method comprises: in response to an exhaust NOx level downstream of an exhaust catalyst, predicted based on engine operating conditions, being higher than a threshold level, providing a total fuel mass as a first amount of fuel injected into an engine intake manifold via a central fuel injector and a second, remaining amount of fuel injected via one or more of port and direct injectors, the first amount of fuel higher than the second amount of fuel. In any of the preceding examples, additionally or optionally, the engine operating conditions include a cold-start condition, and wherein the total fuel mass provided as the first amount of fuel injected via the central fuel injector and the second remaining amount of fuel injected via the one or more of port and direct injectors is maintained until a light-off temperature of the exhaust catalyst is attained. In any or all of the preceding examples, additionally or optionally, the engine operating conditions include a fuel shut-off event, the method further comprising, upon resumption of fueling at an end of the fuel shut-off event, in response to a higher than threshold oxygen content in the exhaust catalyst, injecting the first amount of fuel injected via the central fuel injector and injecting the second remaining amount of fuel injected via one or more of port and direct injectors until the oxygen content in the exhaust catalyst reduces to below the threshold. In any or all of the preceding examples, additionally or optionally, the engine operating conditions include a higher than threshold intake manifold temperature, and wherein the first amount of fuel injected via the central fuel injector and the second remaining amount of fuel injected via the one or more of port and direct injectors is maintained until the intake manifold temperature drops below the threshold temperature. In any or all of the preceding examples, additionally or optionally, the second amount of fuel injected via one or more of port and direct injectors is adjusted based on maldistribution of the first amount of fuel injected via the central fuel injector among a plurality of engine cylinders, the adjusting including increasing direct injection of fuel to a first cylinder in response to the first cylinder receiving a lower portion of the first amount of fuel relative to fuel received by remaining engine cylinders.

In yet another further example, an engine system comprises: an engine intake manifold including a manifold air temperature sensor; a plurality of engine cylinders; one or more direct injectors configured to direct inject a fuel into one or more of the plurality of cylinders; one or more port injectors configured to port inject the fuel into one or more of the plurality of cylinders; a central fuel injector to inject the fuel into the engine intake manifold; an engine exhaust manifold including an exhaust passage, an exhaust catalyst coupled to the exhaust passage, and an exhaust oxygen sensor coupled to the exhaust passage upstream of the exhaust catalyst; and a controller with computer-readable instructions stored on non-transitory memory for: in response to one of a higher than threshold oxygen content in the exhaust catalyst and a higher than threshold engine intake manifold temperature, selectively increasing a ratio of fuel delivered via the central fuel injector relative to fuel delivered via each of the direct injectors and the port injectors, the oxygen content estimated via the exhaust oxygen sensor and the engine intake manifold temperature via the manifold air temperature sensor. In any preceding example, additionally or optionally, the controller contains further instructions for: maintaining engine fueling with the increased ratio of manifold injected delivered via the central fuel injector relative to each of the direct injectors and port injectors until each of the oxygen content in the exhaust catalyst drops below the threshold oxygen content and the engine intake manifold temperature drops below the threshold temperature, and then then adjusting the ratio based on engine speed and engine load. In any or all of the preceding examples, additionally or optionally, selectively increasing the ratio of manifold injected fuel includes selectively increasing a pulse width of the central fuel injector while decreasing a pulse width of the port injector and the direct injector, the pulse width of the central fuel injector based on each of the oxygen content of the exhaust catalyst and the engine intake manifold temperature, the pulse width of the central fuel injector increased as one or more of the oxygen content of the exhaust catalyst increases above the threshold oxygen content and the engine intake manifold temperature increases above the threshold temperature.

In a further representation, the vehicle is a hybrid vehicle.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
estimating an oxygen content of an exhaust catalyst immediately after a fuel shut-off event; and
adjusting a first portion of fuel delivered to an engine via manifold injection relative to a second portion of fuel delivered to the engine via one or more of port and direct injection based on the estimated oxygen content of the exhaust catalyst.

2. The method of claim 1, wherein the adjusting includes increasing the first portion of fuel delivered to the engine via manifold injection while correspondingly decreasing the second portion of fuel delivered via the one or more of port and direct injection in response to the estimated oxygen content of the exhaust catalyst increasing above a threshold oxygen content.

3. The method of claim 2, wherein the adjusting further includes, maintaining engine operation with the increased first portion of fuel and the decreased second portion of fuel until the estimated oxygen content of the exhaust catalyst falls below the threshold oxygen content, and then decreasing the first portion of fuel delivered to the engine via manifold injection while correspondingly increasing the second portion of fuel delivered via the one or more of port and direct injection.

4. The method of claim 2, wherein the adjusted first portion of fuel delivered to the engine via manifold injection is based on the estimated oxygen content of the exhaust catalyst, the first portion is increased as the estimated oxygen content of the exhaust catalyst increases above the threshold oxygen content.

5. The method of claim 4, wherein the second portion of fuel delivered via the one or more of port and direct injection is adjusted based on the first portion to maintain an exhaust air-fuel ratio.

6. The method of claim 1, wherein the one or more of port and direct injection is both direct injection and port injection, and wherein the adjusting further includes, in the second portion of fuel, adjusting a ratio of fuel delivered via port injection relative to fuel delivered via direct injection based on a particulate matter load of an exhaust particulate matter filter coupled one of upstream and downstream of the exhaust catalyst, the adjusting including increasing the ratio of fuel delivered via direct injection relative to port injection when the particulate matter load on the particulate matter filter is lower than a threshold.

7. The method of claim 2, wherein the increasing the first portion of fuel includes increasing the first portion of fuel delivered to an engine via manifold injection relative to the second portion of fuel delivered via the one or more of port and direct injection for a first number of engine cycles immediately after the fuel shut-off event, and during the first number of engine cycles, operating the engine with a richer than stoichiometric exhaust air-fuel ratio.

8. The method of claim 7, wherein the first number of engine cycles is based on an exhaust catalyst oxygen loading, the first number of cycles is increased as the exhaust catalyst oxygen loading increases.

9. The method of claim 1, wherein the fuel shut-off event includes a deceleration fuel shut off event responsive to a lower than threshold operator torque demand.

10. The method of claim 1, wherein the fuel shut-off event includes a transient fuel shut-off event responsive to a transmission gear upshift.

11. The method of claim 1, further comprising, in response to a greater than threshold engine intake manifold temperature, increasing the first portion of fuel delivered to the engine via manifold injection while correspondingly decreasing the second portion of fuel delivered via the one or more of port and direct injection until the engine intake manifold temperature decreases below the threshold engine intake manifold temperature.

12. The method of claim 1, further comprising, in response to a lower than threshold exhaust catalyst temperature, increasing the first portion of fuel delivered to the engine via manifold injection while correspondingly decreasing the second portion of fuel delivered via the one or more of port and direct injection until the exhaust catalyst temperature increases above the threshold exhaust catalyst temperature.

13. An engine method, comprising:
predicting exhaust NOx level downstream of an exhaust catalyst; and
in response to the predicted exhaust NOx level being greater than a threshold level, providing a total fuel mass as a first amount of fuel injected into an engine intake manifold via a central fuel injector and a second, remaining amount of fuel injected via one or more of port and direct injectors, the first amount of fuel greater than the second amount of fuel.

14. The method of claim 13, wherein the engine operating conditions include a cold-start condition, and wherein the total fuel mass provided as the first amount of fuel injected via the central fuel injector and the second remaining amount of fuel injected via the one or more of port and direct injectors is maintained until a light-off temperature of the exhaust catalyst is attained.

15. The method of claim 14, wherein the engine operating conditions include a fuel shut-off event, the method further comprising, upon resumption of fueling at an end of the fuel shut-off event, in response to a greater than threshold oxygen content in the exhaust catalyst, injecting the first amount of fuel injected via the central fuel injector and injecting the second remaining amount of fuel injected via one or more of port and direct injectors until the oxygen content in the exhaust catalyst reduces to below the threshold oxygen content.

16. The method of claim 13, wherein the engine operating conditions include a greater than threshold intake manifold temperature, and wherein the first amount of fuel injected via the central fuel injector and the second remaining amount of fuel injected via the one or more of port and direct injectors is maintained until the intake manifold temperature drops below the threshold temperature.

17. The method of claim 13, wherein the one or more of port and direct injectors is the direct injector, and wherein the second amount of fuel injected via the direct injector is adjusted based on maldistribution of the first amount of fuel injected via the central fuel injector among a plurality of engine cylinders, the adjusting including increasing direct injection of fuel to a first cylinder in response to the first cylinder receiving a lower portion of the first amount of fuel relative to fuel received by remaining engine cylinders.

18. An engine system, comprising:
an engine intake manifold including a manifold air temperature sensor configured to estimate an engine intake manifold temperature;
a plurality of engine cylinders;
one or more direct injectors configured to direct inject a fuel into one or more of the plurality of cylinders;
one or more port injectors configured to port inject the fuel into one or more of the plurality of cylinders;
a central fuel injector to inject the fuel into the engine intake manifold;
an engine exhaust manifold including an exhaust passage, an exhaust catalyst coupled to the exhaust passage, and an exhaust oxygen sensor configured to estimate an oxygen content and coupled to the exhaust passage upstream of the exhaust catalyst; and
a controller with computer-readable instructions stored on non-transitory memory for:
in response to one of the oxygen content being greater than a threshold oxygen content in the exhaust catalyst and the engine intake manifold temperature being greater than a threshold engine intake manifold temperature, selectively increasing a ratio of fuel delivered via the central fuel injector relative to fuel delivered via each of the one or more direct injectors and the one or more port injectors.

19. The system of claim 18, wherein the controller contains further instructions for: maintaining engine fueling with the increased ratio of manifold injected fuel delivered via the central fuel injector relative to each of the one or more of direct injectors and the one or more of port injectors until each of the oxygen content in the exhaust catalyst drops below the threshold oxygen content and the engine intake manifold temperature drops below the threshold temperature, and then adjusting the ratio based on engine speed and engine load.

20. The system of claim 18, wherein selectively increasing the ratio of manifold injected fuel delivered via the central fuel injector includes selectively increasing a pulse width of the central fuel injector while decreasing a pulse width of the one or more of port injectors and the one or more direct injectors, the pulse width of the central fuel injector based on each of the oxygen content of the exhaust catalyst and the engine intake manifold temperature, the pulse width of the central fuel injector is increased as one or more of the oxygen content of the exhaust catalyst increases above the threshold oxygen content and the engine intake manifold temperature increases above the threshold temperature.

* * * * *